(12) United States Patent
Khazeni et al.

(10) Patent No.: US 8,358,266 B2
(45) Date of Patent: Jan. 22, 2013

(54) LIGHT TURNING DEVICE WITH PRISMATIC LIGHT TURNING FEATURES

(75) Inventors: Kasra Khazeni, San Jose, CA (US); Manish Kothari, Cupertino, CA (US); Gang Xu, Cupertino, CA (US); Ion Bita, San Jose, CA (US); Kollengode S. Narayanan, Cupertino, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 537 days.

(21) Appl. No.: 12/552,124

(22) Filed: Sep. 1, 2009

(65) Prior Publication Data
US 2010/0053148 A1      Mar. 4, 2010

Related U.S. Application Data

(60) Provisional application No. 61/093,695, filed on Sep. 2, 2008.

(51) Int. Cl.
*G09G 3/34* (2006.01)

(52) U.S. Cl. ......... 345/108; 362/600; 362/610; 362/615

(58) Field of Classification Search .................. None
See application file for complete search history.

(56) References Cited

U.S. PATENT DOCUMENTS

| | | |
|---|---|---|
| 2,590,906 A | 4/1952 | Tripp |
| 2,677,714 A | 5/1954 | Auwarter |
| 3,247,392 A | 4/1966 | Thelen |
| 3,679,313 A | 7/1972 | Rosenberg |
| 3,728,030 A | 4/1973 | Hawes |
| 3,886,310 A | 5/1975 | Guldberg |
| 3,955,190 A | 5/1976 | Teraishi |
| 4,154,219 A | 5/1979 | Gupta et al. |
| 4,282,862 A | 8/1981 | Soleau |
| 4,375,312 A | 3/1983 | Tangonan |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |

(Continued)

FOREIGN PATENT DOCUMENTS

| | | |
|---|---|---|
| CN | 1612013 | 5/2005 |
| CN | 1517743 | 7/2006 |

(Continued)

OTHER PUBLICATIONS

International Search Report and the Written Opinion dated Oct. 25, 2010 in International Application No. PCT/US2009/055533.

(Continued)

*Primary Examiner* — Adam R Giesy
(74) *Attorney, Agent, or Firm* — Knobbe Martens Olson & Bear LLP

(57) ABSTRACT

A light guide device includes a light guide body and two or more pluralities of spaced-apart slits. The slits are formed by undercuts in the light guide body. Sidewalls of the slits form facets that redirect light impinging on the facets. In some embodiments, the light guide body is attached to a light source. The light source emits light that is injected into the light guide body and the slits redirect the light out of the light guide body and towards a desired target. In some embodiments, the target is a display and a first plurality of slits directs light from the light source across the light guide body and over the face of the display. A second plurality of slits then directs light out of the light guide body and towards the display.

28 Claims, 15 Drawing Sheets

U.S. PATENT DOCUMENTS

| | | | |
|---|---|---|---|
| 4,497,974 | A | 2/1985 | Deckman et al. |
| 4,498,953 | A | 2/1985 | Cook et al. |
| 4,560,435 | A | 12/1985 | Brown et al. |
| 4,655,554 | A | 4/1987 | Armitage |
| 4,705,361 | A | 11/1987 | Frazier et al. |
| 4,779,959 | A | 10/1988 | Saunders |
| 4,786,128 | A | 11/1988 | Birnbach |
| 4,822,993 | A | 4/1989 | Dillon et al. |
| 4,859,060 | A | 8/1989 | Katagiri et al. |
| 4,925,259 | A | 5/1990 | Emmett |
| 4,954,789 | A | 9/1990 | Sampsell |
| 4,956,619 | A | 9/1990 | Hornbeck |
| 4,973,131 | A | 11/1990 | Carnes |
| 4,982,184 | A | 1/1991 | Kirkwood |
| 5,022,745 | A | 6/1991 | Zayhowski et al. |
| 5,028,939 | A | 7/1991 | Hornbeck et al. |
| 5,062,689 | A | 11/1991 | Koehler |
| 5,091,983 | A | 2/1992 | Lukosz |
| 5,096,279 | A | 3/1992 | Hornbeck et al. |
| 5,123,247 | A | 6/1992 | Nelson |
| 5,170,283 | A | 12/1992 | O'Brien et al. |
| 5,206,747 | A | 4/1993 | Wiley et al. |
| 5,291,314 | A | 3/1994 | Agranat et al. |
| 5,315,370 | A | 5/1994 | Bulow |
| 5,381,232 | A | 1/1995 | Van Wijk |
| 5,452,138 | A | 9/1995 | Mignardi et al. |
| 5,471,341 | A | 11/1995 | Warde et al. |
| 5,526,172 | A | 6/1996 | Kanack |
| 5,550,373 | A | 8/1996 | Cole et al. |
| 5,555,160 | A | 9/1996 | Tawara et al. |
| 5,559,358 | A | 9/1996 | Burns et al. |
| 5,561,523 | A | 10/1996 | Blomberg et al. |
| 5,592,332 | A | 1/1997 | Nishio et al. |
| 5,597,736 | A | 1/1997 | Sampsell |
| 5,600,383 | A | 2/1997 | Hornbeck |
| 5,636,052 | A | 6/1997 | Arney et al. |
| 5,646,729 | A | 7/1997 | Koskinen et al. |
| 5,646,768 | A | 7/1997 | Kaeriyama |
| 5,661,592 | A | 8/1997 | Bornstein et al. |
| 5,665,997 | A | 9/1997 | Weaver et al. |
| 5,671,994 | A | 9/1997 | Tai et al. |
| 5,699,181 | A | 12/1997 | Choi |
| 5,710,656 | A | 1/1998 | goossen |
| 5,712,694 | A | 1/1998 | Taira et al. |
| 5,719,068 | A | 2/1998 | Suzawa et al. |
| 5,734,177 | A | 3/1998 | Sakamoto |
| 5,771,116 | A | 6/1998 | Miller et al. |
| 5,783,614 | A | 7/1998 | Chen et al. |
| 5,786,927 | A | 7/1998 | Greywall et al. |
| 5,808,781 | A | 9/1998 | Arney et al. |
| 5,818,095 | A | 10/1998 | Sampsell |
| 5,825,528 | A | 10/1998 | Goossen |
| 5,838,484 | A | 11/1998 | Goossen et al. |
| 5,867,302 | A | 2/1999 | Fleming |
| 5,870,221 | A | 2/1999 | Goossen |
| 5,914,804 | A | 6/1999 | Goossen |
| 5,920,418 | A | 7/1999 | Shiono et al. |
| 5,961,198 | A | 10/1999 | Hira |
| 5,961,848 | A | 10/1999 | Jacquet et al. |
| 6,021,007 | A | 2/2000 | Murtha |
| 6,028,689 | A | 2/2000 | Michalicek et al. |
| 6,031,653 | A | 2/2000 | Wang |
| 6,040,937 | A | 3/2000 | Miles |
| 6,046,659 | A | 4/2000 | Loo et al. |
| 6,055,090 | A | 4/2000 | Miles |
| 6,100,861 | A | 8/2000 | Cohen et al. |
| 6,123,431 | A | 9/2000 | Teragaki |
| 6,124,851 | A | 9/2000 | Jacobsen |
| 6,195,196 | B1 | 2/2001 | Kimura et al. |
| 6,242,932 | B1 | 6/2001 | Hembree |
| 6,259,854 | B1 | 7/2001 | Shinji et al. |
| 6,262,697 | B1 | 7/2001 | Stephenson |
| 6,292,504 | B1 | 9/2001 | Halmos |
| 6,301,000 | B1 | 10/2001 | Johnson |
| 6,323,987 | B1 | 11/2001 | Rinaudo et al. |
| 6,327,071 | B1 | 12/2001 | Kimura |
| 6,335,235 | B1 | 1/2002 | Bhekta et al. |
| 6,351,329 | B1 | 2/2002 | Greywall |
| 6,356,378 | B1 | 3/2002 | Huibers |
| 6,377,233 | B2 | 4/2002 | Colgan et al. |
| 6,379,017 | B2 | 4/2002 | Nakabayashi et al. |
| 6,381,022 | B1 | 4/2002 | Zavracky |
| 6,384,952 | B1 | 5/2002 | Clark et al. |
| 6,400,738 | B1 | 6/2002 | Tucker et al. |
| 6,407,785 | B1 | 6/2002 | Yamazaki |
| 6,433,917 | B1 | 8/2002 | Mei et al. |
| 6,437,583 | B1 | 8/2002 | Tartagni et al. |
| 6,438,282 | B1 | 8/2002 | Takeda et al. |
| 6,452,712 | B2 | 9/2002 | Atobe et al. |
| 6,466,354 | B1 | 10/2002 | Gudeman |
| 6,512,626 | B1 | 1/2003 | Schmidt |
| 6,519,073 | B1 | 2/2003 | Goossen |
| 6,556,338 | B2 | 4/2003 | Han et al. |
| 6,574,033 | B1 | 6/2003 | Chui et al. |
| 6,592,234 | B2 | 7/2003 | Epstein et al. |
| 6,597,490 | B2 | 7/2003 | Tayebati |
| 6,601,984 | B2 * | 8/2003 | Yamamoto et al. ........... 362/600 |
| 6,608,268 | B1 | 8/2003 | Goldsmith |
| 6,632,698 | B2 | 10/2003 | Ives |
| 6,650,455 | B2 | 11/2003 | Miles |
| 6,657,683 | B2 | 12/2003 | Richard |
| 6,657,832 | B2 | 12/2003 | Williams et al. |
| 6,661,561 | B2 | 12/2003 | Fitzpatrick et al. |
| 6,667,782 | B1 | 12/2003 | Taira et al. |
| 6,669,350 | B2 | 12/2003 | Yamashita et al. |
| 6,674,562 | B1 | 1/2004 | Miles et al. |
| 6,680,792 | B2 | 1/2004 | Miles |
| 6,698,295 | B1 | 3/2004 | Sherrer |
| 6,706,339 | B1 | 3/2004 | Miyatake et al. |
| 6,710,908 | B2 | 3/2004 | Miles et al. |
| 6,738,194 | B1 | 5/2004 | Ramirez et al. |
| 6,747,801 | B2 | 6/2004 | Umemoto et al. |
| 6,760,146 | B2 | 7/2004 | Ikeda et al. |
| 6,768,555 | B2 | 7/2004 | Chen |
| 6,778,746 | B2 | 8/2004 | Charlton et al. |
| 6,794,119 | B2 | 9/2004 | Miles |
| 6,799,860 | B2 * | 10/2004 | Nakaoka et al. .............. 362/615 |
| 6,813,059 | B2 | 11/2004 | Hunter et al. |
| 6,829,258 | B1 | 12/2004 | Carlisle et al. |
| 6,836,366 | B1 | 12/2004 | Flanders et al. |
| 6,841,081 | B2 | 1/2005 | Chang et al. |
| 6,844,959 | B2 | 1/2005 | Huibers et al. |
| 6,849,471 | B2 | 2/2005 | Patel et al. |
| 6,862,127 | B1 | 3/2005 | Ishii |
| 6,865,312 | B2 | 3/2005 | Niv et al. |
| 6,867,896 | B2 | 3/2005 | Miles |
| 6,870,654 | B2 | 3/2005 | Lin et al. |
| 6,879,354 | B1 | 4/2005 | Sawayama et al. |
| 6,882,458 | B2 | 4/2005 | Lin et al. |
| 6,882,461 | B1 | 4/2005 | Tsai et al. |
| 6,883,924 | B2 | 4/2005 | Maeda et al. |
| 6,891,530 | B2 | 5/2005 | Umemoto et al. |
| 6,892,009 | B2 * | 5/2005 | Ito et al. ......................... 385/49 |
| 6,896,386 | B2 * | 5/2005 | Kitazawa et al. ............. 362/616 |
| 6,912,022 | B2 | 6/2005 | Lin et al. |
| 6,913,942 | B2 | 7/2005 | Patel et al. |
| 6,927,387 | B2 | 8/2005 | Viktorovitch |
| 6,940,630 | B2 | 9/2005 | Xie |
| 6,947,200 | B2 | 9/2005 | Huibers |
| 6,952,303 | B2 | 10/2005 | Lin et al. |
| 6,958,847 | B2 | 10/2005 | Lin |
| 6,960,305 | B2 | 11/2005 | Doan et al. |
| 6,980,350 | B2 | 12/2005 | Hung et al. |
| 6,982,820 | B2 | 1/2006 | Tsai |
| 7,002,726 | B2 | 2/2006 | Patel et al. |
| 7,006,272 | B2 | 2/2006 | Tsai |
| 7,009,754 | B2 | 3/2006 | Huibers |
| 7,010,212 | B2 | 3/2006 | Emmons et al. |
| 7,027,204 | B2 | 4/2006 | Trisnadi et al. |
| 7,034,981 | B2 | 4/2006 | Makigaki |
| 7,042,643 | B2 | 5/2006 | Miles |
| 7,046,422 | B2 | 5/2006 | Kimura et al. |
| 7,072,093 | B2 | 7/2006 | Piehl et al. |
| 7,072,096 | B2 | 7/2006 | Holman et al. |
| 7,113,339 | B2 | 9/2006 | Taguchi et al. |
| 7,119,945 | B2 | 10/2006 | Kothari et al. |
| 7,123,216 | B1 | 10/2006 | Miles |

| | | |
|---|---|---|
| 7,126,738 B2 | 10/2006 | Miles |
| 7,128,459 B2 * | 10/2006 | Igarashi et al. ............... 362/621 |
| 7,130,104 B2 | 10/2006 | Cummings |
| 7,133,022 B2 | 11/2006 | Grabert |
| 7,184,195 B2 | 2/2007 | Yang |
| 7,184,202 B2 | 2/2007 | Miles et al. |
| 7,198,973 B2 | 4/2007 | Lin et al. |
| 7,218,812 B2 | 5/2007 | Maxwell et al. |
| 7,221,495 B2 | 5/2007 | Miles et al. |
| 7,224,512 B2 | 5/2007 | Liu et al. |
| 7,236,284 B2 | 6/2007 | Miles |
| 7,245,285 B2 | 7/2007 | Yeh et al. |
| 7,262,754 B1 | 8/2007 | Yamazaki |
| 7,278,774 B2 | 10/2007 | Chang |
| 7,289,259 B2 | 10/2007 | Chui et al. |
| 7,302,157 B2 | 11/2007 | Chui |
| 7,304,784 B2 | 12/2007 | Chui et al. |
| 7,321,456 B2 | 1/2008 | Cummings |
| 7,321,457 B2 | 1/2008 | Heald |
| 7,327,510 B2 | 2/2008 | Cummings et al. |
| 7,352,501 B2 | 4/2008 | Chopra et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,400,488 B2 | 7/2008 | Lynch et al. |
| 7,405,852 B2 | 7/2008 | Brosnihan et al. |
| 7,417,746 B2 | 8/2008 | Lin et al. |
| 7,417,784 B2 | 8/2008 | Sasagawa et al. |
| 7,420,725 B2 | 9/2008 | Kothari |
| 7,436,573 B2 | 10/2008 | Doan et al. |
| 7,450,295 B2 | 11/2008 | Tung et al. |
| 7,459,402 B2 | 12/2008 | Doan et al. |
| 7,460,291 B2 | 12/2008 | Sampsell et al. |
| 7,460,292 B2 | 12/2008 | Chou |
| 7,476,327 B2 | 1/2009 | Tung et al. |
| 7,477,440 B1 | 1/2009 | Huang et al. |
| 7,492,503 B2 | 2/2009 | Chui |
| 7,508,566 B2 | 3/2009 | Feenstra et al. |
| 7,515,327 B2 | 4/2009 | Cummings |
| 7,527,995 B2 | 5/2009 | Sampsell |
| 7,532,377 B2 | 5/2009 | Miles |
| 7,535,621 B2 | 5/2009 | Chiang |
| 7,542,198 B2 | 6/2009 | Kothari |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,561,321 B2 | 7/2009 | Heald |
| 7,564,612 B2 | 7/2009 | Chui |
| 7,566,664 B2 | 7/2009 | Yan et al. |
| 7,567,373 B2 | 7/2009 | Chui et al. |
| 7,569,488 B2 | 8/2009 | Rafanan |
| 7,612,932 B2 | 11/2009 | Chui et al. |
| 7,612,933 B2 | 11/2009 | Djordjev |
| 7,629,197 B2 | 12/2009 | Luo et al. |
| 7,630,119 B2 | 12/2009 | Tung et al. |
| 7,630,121 B2 | 12/2009 | Endisch et al. |
| 7,643,199 B2 | 1/2010 | Lan |
| 7,643,202 B2 | 1/2010 | Sasagawa |
| 7,649,671 B2 | 1/2010 | Kothari et al. |
| 7,653,371 B2 | 1/2010 | Floyd |
| 7,663,794 B2 | 2/2010 | Cummings |
| 7,672,035 B2 | 3/2010 | Sampsell et al. |
| 7,692,844 B2 | 4/2010 | Miles |
| 7,704,772 B2 | 4/2010 | Tung et al. |
| 7,706,050 B2 | 4/2010 | Sampsell |
| 7,715,079 B2 | 5/2010 | Kogut et al. |
| 7,715,085 B2 | 5/2010 | Sasagawa |
| 7,719,500 B2 | 5/2010 | Chui |
| 7,733,439 B2 | 6/2010 | Sampsell et al. |
| 7,738,157 B2 | 6/2010 | Miles |
| 7,742,220 B2 | 6/2010 | Kogut et al. |
| 7,746,539 B2 | 6/2010 | Sampsell |
| 7,750,886 B2 | 7/2010 | Sampsell |
| 7,766,531 B2 | 8/2010 | Anderson et al. |
| 7,768,690 B2 | 8/2010 | Sampsell |
| 7,773,286 B2 | 8/2010 | Mignard |
| 7,782,517 B2 | 8/2010 | Griffiths et al. |
| 7,782,523 B2 | 8/2010 | Ishii |
| 7,787,173 B2 | 8/2010 | Chui |
| 7,808,694 B2 | 10/2010 | Miles |
| 7,813,029 B2 | 10/2010 | Kothari et al. |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,835,061 B2 | 11/2010 | Kogut et al. |
| 7,839,557 B2 | 11/2010 | Chui et al. |
| 7,847,999 B2 | 12/2010 | Lee et al. |
| 7,848,003 B2 | 12/2010 | Kothari et al. |
| 7,852,544 B2 | 12/2010 | Sampsell |
| 7,852,545 B2 | 12/2010 | Miles |
| 7,855,826 B2 | 12/2010 | de Groot |
| 7,864,395 B2 | 1/2011 | Chui |
| 7,898,722 B2 | 3/2011 | Miles |
| 2001/0003487 A1 | 6/2001 | Miles |
| 2001/0019479 A1 * | 9/2001 | Nakabayashi et al. .......... 362/31 |
| 2001/0028503 A1 | 10/2001 | Flanders et al. |
| 2001/0043171 A1 | 11/2001 | Van Gorkom et al. |
| 2001/0055208 A1 | 12/2001 | Kimura |
| 2002/0054424 A1 | 5/2002 | Miles |
| 2002/0070931 A1 | 6/2002 | Ishikawa |
| 2002/0075555 A1 | 6/2002 | Miles |
| 2002/0080465 A1 | 6/2002 | Han et al. |
| 2002/0106182 A1 | 8/2002 | Kawashima |
| 2002/0113241 A1 | 8/2002 | Kubota et al. |
| 2002/0126364 A1 | 9/2002 | Miles |
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0026536 A1 | 2/2003 | Ho |
| 2003/0030764 A1 | 2/2003 | Lee |
| 2003/0034445 A1 | 2/2003 | Boyd et al. |
| 2003/0035196 A1 | 2/2003 | Walker |
| 2003/0043157 A1 | 3/2003 | Miles |
| 2003/0053078 A1 | 3/2003 | Missey et al. |
| 2003/0071947 A1 | 4/2003 | Shiraogawa et al. |
| 2003/0083429 A1 | 5/2003 | Smith et al. |
| 2003/0086030 A1 | 5/2003 | Taniguchi et al. |
| 2003/0086031 A1 | 5/2003 | Taniguchi et al. |
| 2003/0090887 A1 | 5/2003 | Igarashi et al. |
| 2003/0095401 A1 | 5/2003 | Hanson et al. |
| 2003/0103344 A1 | 6/2003 | Niida et al. |
| 2003/0119221 A1 | 6/2003 | Cunningham et al. |
| 2003/0123125 A1 | 7/2003 | Little |
| 2003/0123245 A1 | 7/2003 | Parker |
| 2003/0128538 A1 | 7/2003 | Shinohara et al. |
| 2003/0138669 A1 | 7/2003 | Kojima et al. |
| 2003/0165067 A1 | 9/2003 | Imamura et al. |
| 2003/0169385 A1 | 9/2003 | Okuwaki |
| 2003/0173504 A1 | 9/2003 | Cole et al. |
| 2003/0184989 A1 | 10/2003 | Matsumoto et al. |
| 2003/0202265 A1 | 10/2003 | Reboa et al. |
| 2003/0202266 A1 | 10/2003 | Ring et al. |
| 2003/0210222 A1 | 11/2003 | Ogiwara et al. |
| 2003/0210367 A1 | 11/2003 | Nakano et al. |
| 2004/0001169 A1 | 1/2004 | Saiki et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0135494 A1 | 7/2004 | Miyatake |
| 2004/0145811 A1 | 7/2004 | Lin et al. |
| 2004/0147198 A1 | 7/2004 | Lin et al. |

| | | |
|---|---|---|
| 2004/0175577 A1 | 9/2004 | Lin et al. |
| 2004/0184134 A1 | 9/2004 | Makigaki |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Pichl et al. |
| 2004/0218251 A1 | 11/2004 | Piehl et al. |
| 2004/0228109 A1 | 11/2004 | Leu et al. |
| 2004/0228112 A1 | 11/2004 | Takata |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0024890 A1 | 2/2005 | Yamamoto et al. |
| 2005/0030732 A1 | 2/2005 | Kimura |
| 2005/0035699 A1 | 2/2005 | Tsai |
| 2005/0036095 A1 | 2/2005 | Yeh et al. |
| 2005/0046011 A1 | 3/2005 | Chen et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0069254 A1 | 3/2005 | Schultheis et al. |
| 2005/0078348 A1 | 4/2005 | Lin |
| 2005/0088719 A1 | 4/2005 | Patel et al. |
| 2005/0116924 A1 | 6/2005 | Sauvante et al. |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0179977 A1 | 8/2005 | Chui et al. |
| 2005/0185416 A1 | 8/2005 | Lee et al. |
| 2005/0195462 A1 | 9/2005 | Lin |
| 2005/0231981 A1 | 10/2005 | Hoelen et al. |
| 2005/0259302 A9 | 11/2005 | Metz et al. |
| 2005/0270798 A1 | 12/2005 | Lee et al. |
| 2005/0271325 A1 | 12/2005 | Anderson et al. |
| 2005/0275930 A1 | 12/2005 | Patel et al. |
| 2006/0002141 A1 | 1/2006 | Ouderkirk et al. |
| 2006/0002675 A1 | 1/2006 | Choi et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0038643 A1 | 2/2006 | Xu et al. |
| 2006/0044246 A1* | 3/2006 | Mignard ............... 345/98 |
| 2006/0061705 A1 | 3/2006 | Onishi |
| 2006/0065940 A1 | 3/2006 | Kothari |
| 2006/0066640 A1 | 3/2006 | Kothari et al. |
| 2006/0066641 A1 | 3/2006 | Gally et al. |
| 2006/0077155 A1 | 4/2006 | Chui et al. |
| 2006/0077156 A1 | 4/2006 | Chui et al. |
| 2006/0077617 A1 | 4/2006 | Floyd |
| 2006/0082588 A1 | 4/2006 | Mizuno et al. |
| 2006/0082863 A1 | 4/2006 | Piehl et al. |
| 2006/0110090 A1 | 5/2006 | Ellwood |
| 2006/0132383 A1 | 6/2006 | Gally et al. |
| 2006/0132927 A1 | 6/2006 | Yoon |
| 2006/0180886 A1 | 8/2006 | Tsang |
| 2006/0187676 A1 | 8/2006 | Ishikura |
| 2006/0220160 A1 | 10/2006 | Miles |
| 2006/0262562 A1 | 11/2006 | Fukasawa |
| 2006/0268574 A1 | 11/2006 | Jung et al. |
| 2006/0291769 A1 | 12/2006 | Spoonhower et al. |
| 2007/0001187 A1 | 1/2007 | Kim |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0097694 A1 | 5/2007 | Faase et al. |
| 2007/0115415 A1 | 5/2007 | Piehl et al. |
| 2007/0121118 A1 | 5/2007 | Gally et al. |
| 2007/0133226 A1 | 6/2007 | Mi |
| 2007/0138608 A1 | 6/2007 | Ikehashi |
| 2007/0147087 A1 | 6/2007 | Parker et al. |
| 2007/0153860 A1 | 7/2007 | Chang-Hasnain et al. |
| 2007/0171418 A1 | 7/2007 | Nyhart |
| 2007/0177247 A1 | 8/2007 | Miles |
| 2007/0187852 A1 | 8/2007 | Parker et al. |
| 2007/0189036 A1 | 8/2007 | Chen et al. |
| 2007/0216987 A1 | 9/2007 | Hagood et al. |
| 2007/0236957 A1 | 10/2007 | Koganezawa |
| 2007/0253054 A1 | 11/2007 | Miles |
| 2007/0258123 A1 | 11/2007 | Xu et al. |
| 2007/0279727 A1 | 12/2007 | Gandhi et al. |
| 2007/0279730 A1 | 12/2007 | Heald |
| 2007/0285761 A1 | 12/2007 | Zhong et al. |
| 2007/0292091 A1 | 12/2007 | Fujii et al. |
| 2008/0002299 A1 | 1/2008 | Thurn |
| 2008/0013145 A1 | 1/2008 | Chui et al. |
| 2008/0030657 A1 | 2/2008 | Wu et al. |
| 2008/0055706 A1 | 3/2008 | Chui et al. |
| 2008/0068697 A1 | 3/2008 | Haluzak et al. |
| 2008/0080043 A1 | 4/2008 | Chui et al. |
| 2008/0088910 A1 | 4/2008 | Miles |
| 2008/0089092 A1 | 4/2008 | Lee et al. |
| 2008/0090025 A1 | 4/2008 | Freking |
| 2008/0094690 A1 | 4/2008 | Luo et al. |
| 2008/0094853 A1 | 4/2008 | Kim et al. |
| 2008/0110855 A1 | 5/2008 | Cummings |
| 2008/0158645 A1 | 7/2008 | Chiang |
| 2008/0186581 A1 | 8/2008 | Bita et al. |
| 2008/0232135 A1 | 9/2008 | Kinder et al. |
| 2008/0239755 A1* | 10/2008 | Parker et al. ............... 362/619 |
| 2008/0278663 A1 | 11/2008 | Krishnan et al. |
| 2008/0285307 A1 | 11/2008 | Aylward et al. |
| 2008/0297880 A1 | 12/2008 | Steckl et al. |
| 2009/0015753 A1 | 1/2009 | Ye |
| 2009/0021884 A1 | 1/2009 | Nakamura |
| 2009/0078316 A1 | 3/2009 | Khazeni |
| 2009/0101192 A1 | 4/2009 | Kothari et al. |
| 2009/0103166 A1 | 4/2009 | Khazeni et al. |
| 2009/0122384 A1 | 5/2009 | Felnhofer et al. |
| 2009/0126792 A1 | 5/2009 | Gruhlke |
| 2009/0135469 A1 | 5/2009 | Lee et al. |
| 2009/0147332 A1 | 6/2009 | Bita et al. |
| 2009/0159123 A1 | 6/2009 | Kothari |
| 2009/0168459 A1 | 7/2009 | Holman et al. |
| 2009/0201566 A1 | 8/2009 | Kothari |
| 2009/0211885 A1 | 8/2009 | Steeneken et al. |
| 2009/0213450 A1 | 8/2009 | Sampsell |
| 2009/0213451 A1 | 8/2009 | Tung et al. |
| 2009/0225395 A1 | 9/2009 | Ganti et al. |
| 2009/0231666 A1 | 9/2009 | Gudlavalleti et al. |
| 2009/0251761 A1 | 10/2009 | Khazeni et al. |
| 2009/0256218 A1 | 10/2009 | Mignard et al. |
| 2009/0257105 A1 | 10/2009 | Xu et al. |
| 2009/0273823 A1 | 11/2009 | Tung et al. |
| 2009/0273824 A1 | 11/2009 | Sasagawa |
| 2009/0279162 A1 | 11/2009 | Chui |
| 2009/0293955 A1 | 12/2009 | Kothari et al. |
| 2009/0296193 A1 | 12/2009 | Bita et al. |
| 2009/0323153 A1 | 12/2009 | Sampsell |
| 2010/0014148 A1 | 1/2010 | Djordjev |
| 2010/0080890 A1 | 4/2010 | Tung et al. |
| 2010/0085626 A1 | 4/2010 | Tung et al. |
| 2010/0118382 A1 | 5/2010 | Kothari et al. |
| 2010/0128337 A1 | 5/2010 | Tung |
| 2010/0142226 A1 | 6/2010 | Vogt et al. |
| 2010/0180946 A1 | 7/2010 | Gruhlke et al. |
| 2010/0231510 A1 | 9/2010 | Sampsell et al. |
| 2010/0236624 A1 | 9/2010 | Khazeni et al. |
| 2010/0309572 A1 | 12/2010 | Mignard |
| 2010/0309687 A1 | 12/2010 | Sampsell et al. |
| 2011/0019380 A1 | 1/2011 | Miles |
| 2011/0026095 A1 | 2/2011 | Kothari et al. |
| 2011/0026096 A1 | 2/2011 | Miles |
| 2011/0038027 A1 | 2/2011 | Miles |
| 2011/0044496 A1 | 2/2011 | Chui et al. |
| 2011/0069371 A1 | 3/2011 | Kothari et al. |
| 2011/0080632 A1 | 4/2011 | Miles |
| 2011/0090554 A1 | 4/2011 | Tung |
| 2011/0116156 A1 | 5/2011 | Kothari |
| 2011/0122479 A1 | 5/2011 | Sampsell |
| 2011/0134505 A1 | 6/2011 | Sasagawa |
| 2011/0170166 A1 | 7/2011 | Miles |

| | | | |
|---|---|---|---|
| 2011/0170167 A1 | 7/2011 | Miles | |
| 2011/0170168 A1 | 7/2011 | Endisch et al. | |
| 2011/0188109 A1 | 8/2011 | Chui et al. | |
| 2011/0188110 A1 | 8/2011 | Miles | |
| 2011/0194169 A1 | 8/2011 | Ganti et al. | |

FOREIGN PATENT DOCUMENTS

| | | |
|---|---|---|
| DE | 10 2006 039 071 | 2/2008 |
| DE | 10 2007 025092 | 12/2008 |
| EP | 0 035 299 | 9/1983 |
| EP | 0 278 038 | 8/1988 |
| EP | 0 539 099 | 4/1993 |
| EP | 0 590 511 | 4/1994 |
| EP | 0 621 500 | 10/1994 |
| EP | 0 668 490 | 8/1995 |
| EP | 0 695 959 | 2/1996 |
| EP | 0 879 991 A2 | 11/1998 |
| EP | 0 969 306 | 1/2000 |
| EP | 0 986 077 | 3/2000 |
| EP | 1 116 987 | 7/2001 |
| EP | 1 122 577 | 8/2001 |
| EP | 1 122 586 | 8/2001 |
| EP | 1 251 454 | 4/2002 |
| EP | 1 205 782 | 5/2002 |
| EP | 1 271 223 | 6/2002 |
| EP | 1 227 346 | 7/2002 |
| EP | 1 275 997 | 1/2003 |
| EP | 1 403 212 | 3/2004 |
| EP | 1 437 610 | 7/2004 |
| EP | 1 473 581 | 11/2004 |
| EP | 1 577 701 | 9/2005 |
| EP | 1 732 141 A | 12/2006 |
| EP | 1 762 778 A | 3/2007 |
| EP | 1 928 028 A1 | 6/2008 |
| EP | 1 975 651 | 10/2008 |
| FR | 2 889 597 A | 2/2007 |
| GB | 2 331 615 | 5/1999 |
| GB | 2 351 834 | 1/2001 |
| JP | 56-088111 | 7/1981 |
| JP | 5-49238 | 2/1993 |
| JP | 5-281479 | 10/1993 |
| JP | 08 051230 | 2/1996 |
| JP | 09-171111 | 6/1997 |
| JP | 09-189910 | 7/1997 |
| JP | 11211999 | 8/1999 |
| JP | 11-326898 | 11/1999 |
| JP | 2000-075293 | 3/2000 |
| JP | 2000 147262 | 5/2000 |
| JP | 2000-193933 | 11/2000 |
| JP | 2000-314882 | 11/2000 |
| JP | 2001-221913 | 8/2001 |
| JP | 2001 249283 | 9/2001 |
| JP | 2002-062490 | 2/2002 |
| JP | 2002-108227 | 4/2002 |
| JP | 2002-174780 | 6/2002 |
| JP | 2002-221678 | 8/2002 |
| JP | 2002-229023 | 8/2002 |
| JP | 2002-245835 | 12/2002 |
| JP | 2003-057653 | 2/2003 |
| JP | 2003-340795 | 2/2003 |
| JP | 2003 177336 | 6/2003 |
| JP | 2003-344881 | 12/2003 |
| JP | 2004-012642 | 1/2004 |
| JP | 2004-212638 | 7/2004 |
| JP | 2004-212680 | 7/2004 |
| JP | 2005-259365 | 9/2005 |
| JP | 2005 279831 | 10/2005 |
| JP | 2005-308871 | 11/2005 |
| JP | 2006 065360 A | 3/2006 |
| JP | 2006 107993 | 4/2006 |
| JP | 2006 215509 | 8/2006 |
| JP | 2007 027150 | 2/2007 |
| JP | 2007 218540 A | 8/2007 |
| JP | 2007 279474 | 10/2007 |
| TW | 567388 | 12/2003 |
| TW | 200510868 | 3/2005 |
| WO | WO 98/14804 | 4/1998 |
| WO | WO 98/19201 | 5/1998 |
| WO | WO 98/43129 | 10/1998 |
| WO | WO 99/64785 | 12/1999 |
| WO | WO 01/06816 | 1/2001 |
| WO | WO 01/29148 | 4/2001 |
| WO | WO 01/53113 | 7/2001 |
| WO | WO 01/57434 | 8/2001 |
| WO | WO 01/84228 | 11/2001 |
| WO | WO 01/84229 | 11/2001 |
| WO | WO 02/24570 | 3/2002 |
| WO | WO 02/086582 | 10/2002 |
| WO | WO 03/105198 | 12/2003 |
| WO | WO 2004/036270 | 4/2004 |
| WO | WO 2004/114418 | 12/2004 |
| WO | WO 2004/114418 A1 | 12/2004 |
| WO | WO 2005/073622 | 8/2005 |
| WO | WO 2005/073622 A1 | 8/2005 |
| WO | WO 2006/035698 A1 | 4/2006 |
| WO | WO 2007/036422 | 4/2007 |
| WO | WO 2007/045875 | 4/2007 |
| WO | WO 2007/053438 | 5/2007 |
| WO | WO 2007/064133 | 6/2007 |
| WO | WO 2007/072998 | 6/2007 |
| WO | WO 2007/142978 | 12/2007 |
| WO | WO 2008/045200 | 4/2008 |
| WO | WO 2008/045207 | 4/2008 |
| WO | WO 2008/045224 | 4/2008 |
| WO | WO 2008047274 A2 * | 4/2008 |
| WO | WO 2008/062363 A2 | 5/2008 |
| WO | WO 2009/011922 | 1/2009 |

OTHER PUBLICATIONS

Conner, Hybrid Color Display Using Optical Interference Filter Array, SID Digest, pp. 577-580 (1993).

Feenstra et al., Electrowetting displays, Liquavista BV, 16 pp., Jan. 2006.

Jerman et al., A Miniature Fabry-Perot Interferometer with a Corrugated Silicon Diaphragm Support, (1988).

Jerman et al., Miniature Fabry-Perot Interferometers Micromachined in Silicon for Use in Optical Fiber WDM Systems, Transducers, San Francisco, Jun. 24-27, 1991, Proceedings on the Int'l. Conf. on Solid State Sensors and Actuators, Jun. 24, 1991, pp. 372-375.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Lezec, Submicrometer dimple array based interference color field displays and sensors, Nano Lett. 7(2):329-333, Dec. 23, 2006.

Londergan et al., Advanced processes for MEMS-based displays, Proceedings of the Asia Display 2007, SID, 1:107-112.

Longhurst, 1963, Chapter IX: Multiple Beam Interferometry, in Geometrical and Physical Optics, pp. 153-157.

Miles, A New Reflective FPD Technology Using Interferometric Modulation, Journal of the SID, 5/4, 1997.

Miles, Interferometric modulation: MOEMS as an enabling technology for high performance reflective displays, Proceedings of SPIE, 4985:131-139, 2003.

Nakagawa et al., Feb. 1, 2002, Wide-field-of-view narrow-band spectral filters based on photonic crystal nanocavities, Optics Letters, 27(3):191-193.

Pape et al., Characteristics of the deformable mirror device for optical information processing, Optical Engineering, 22(6):676-681, Nov.-Dec. 1983.

Taii et al., A transparent sheet display by plastic MEMS, Journal of the SID 14(8):735-741, 2006.

Tolansky, 1948, Chapter II: Multiple-Beam Interference, in Multiple-bean Interferometry of Surfaces and Films, Oxford at the Clarendon Press, pp. 8-11.

IPRP dated Jul. 27, 2010 in PCT/US09/055527.

International Search Report and the Written Opinion dated Dec. 30, 2009 in counterpart International Application No. PCT/US2009/055527.

Billard, Tunable Capacitor, 5th Annual Review of LETI, Jun. 24, 2003, p. 7.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Mehregany et al., 1996, MEMS applications in optical systems, IEEE/LEOS 1996 Summer Topical Meetings, pp. 75-76.

Miles et al, Oct. 21, 1997, A MEMS based interferometric modulator (IMOD) for display applications, Proceedings of Sensors Expo, pp. 281-284.

Nieminen et al., 2004, Design of a temperature-stable RF MEM capacitor, IEEE Journal of Microelectromechanical Systems, 13(5):705-714.

Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

Qualcomm MEMS Technologies, Inc., May 2008, Interferometric Modulator (IMOD) Technology Overview, White Paper, 14 pp.

Brosnihan et al., Jun. 2003, Optical IMEMS—a fabrication process for MEMS optical switches with integrated on-chip electronic, Transducers, Solid-State Sensors, Actuators and Microsystems, $12^{th}$ International Conference 2003, 2(8-12):1638-1642.

Cacharelis et al., 1997, A Reflective-mode PDLC Light Valve Display Technology, Proceedings of European Solid State Device Research Conference (ESSDERC), pp. 596-599.

Dokmeci et al., Dec. 2004, Two-axis single-crystal silicon micromirror arrays, Journal of Microelectromechanical Systems, 13(6):1006-1017.

Maier et al., 1996, 1.3" active matrix liquid crystal spatial light modulator with 508 dpi resolution, SPIE vol. 2754, pp. 171-179.

Neal et al., Surface plasmon enhanced emission from dye doped polymer layers, Optics Express, 13(14):5522-5527, Jul. 1, 2005.

Petschick et al., Fabry-Perot-Interferometer, Nov. 15, 2002, retrieved from the Internet: URL:http://pl.physik.tu-berlin.de/groups/pg279/protokollesse02/04_fpi.pdf> retrieved on Apr. 14, 2009.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

LIGHT TURNING DEVICE WITH PRISMATIC LIGHT TURNING FEATURES

REFERENCE TO RELATED APPLICATION

This application claims the priority benefit under 35 U.S.C. 119(e) of U.S. Provisional Patent Application No. 61/093,695, filed Sep. 2, 2008.

BACKGROUND

1. Field of the Invention

This invention relates generally to light turning devices. More particularly, this invention relates to light turning devices utilizing prismatic structures to guide light to, for example, illuminate a display. This invention also relates to methods of use and fabrication of these devices.

2. Description of Related Technology

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In some embodiments, a light guide apparatus is provided. The apparatus comprises a light guide body formed of a light propagating material that supports the propagation of light through a length of the light guide body. The light guide body is defined by a plurality of exterior surfaces. A first of the exterior surfaces comprises a first plurality of spaced-apart slits configured to redirect light incident on the light guide body, with each slit formed by an undercut in the first exterior surface. A second of the exterior surfaces comprises a second plurality of spaced-apart slits configured to redirect light incident on the light guide body, with each slit formed by an undercut in the second exterior surface.

In some other embodiments, an illumination apparatus is provided. The apparatus comprises a first means for generating light and directing the light to propagate through a light turning body; a second means for redirecting the light propagating through the light turning body; and a third means for redirecting the light propagating through the light turning body.

In yet other embodiments, a method for illumination is provided. The method comprises propagating light through a light turning body. Light propagating through the body is redirected by impinging the light on facets of a first and a second plurality of slits. The pluralities of slits are formed by undercuts in two surfaces of the light turning body.

In some other embodiments, a method for manufacturing an illumination device is provided. The method comprises providing a body of light propagating material that supports the propagation of light through a length of the body. First and second pluralities of spaced-apart undercuts are formed in different sides of the body. In some other embodiments, the illumination device formed by this method is provided.

DETAILED DESCRIPTION

The following detailed description is directed to certain specific embodiments. However, the teachings herein can be applied in a multitude of different ways. In this description, reference is made to the drawings wherein like or similar parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Some embodiments disclosed herein include a light guide having undercuts in the body of the light guide. The undercuts form prismatic features, also referred to as slits, that turn or redirect light propagating through the light guide body. For example, the walls of the undercuts form facets that reflect light in a desired direction. In some embodiments, a light source is connected to the light guide body. Light from the light source is injected into the light guide body, propagates through the body and contacts the facets of the undercuts. The facets of the slits redirect the light out of the light guide body, e.g., to a display formed of, e.g., interferometric modulators. In some embodiments, first and second pluralities of slits are provided on opposite major surfaces of the light guide body. The slits are configured to redirect the light out of a common major surface.

In some other embodiments, a plurality of slits is formed in a line light source. For example, the slits are positioned and angled to turn light injected into the line light source from a point light emitter at the end of the line light source. The turned light can, e.g., be expelled out of the line light source along the length of the light source or, in some other embodiments, to an area containing a second plurality of slits. The second plurality of slits can turn the light towards a display.

Figure 1:
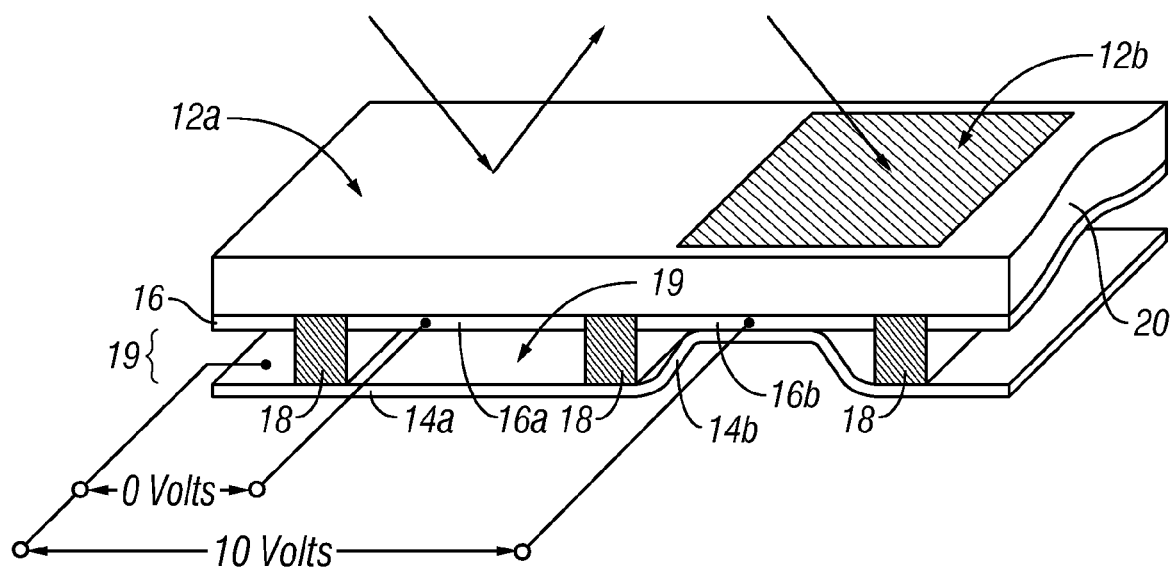
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5B illustrate one exemplary process and system for using an array of interferometric modulators in a display application.

Figure 2:
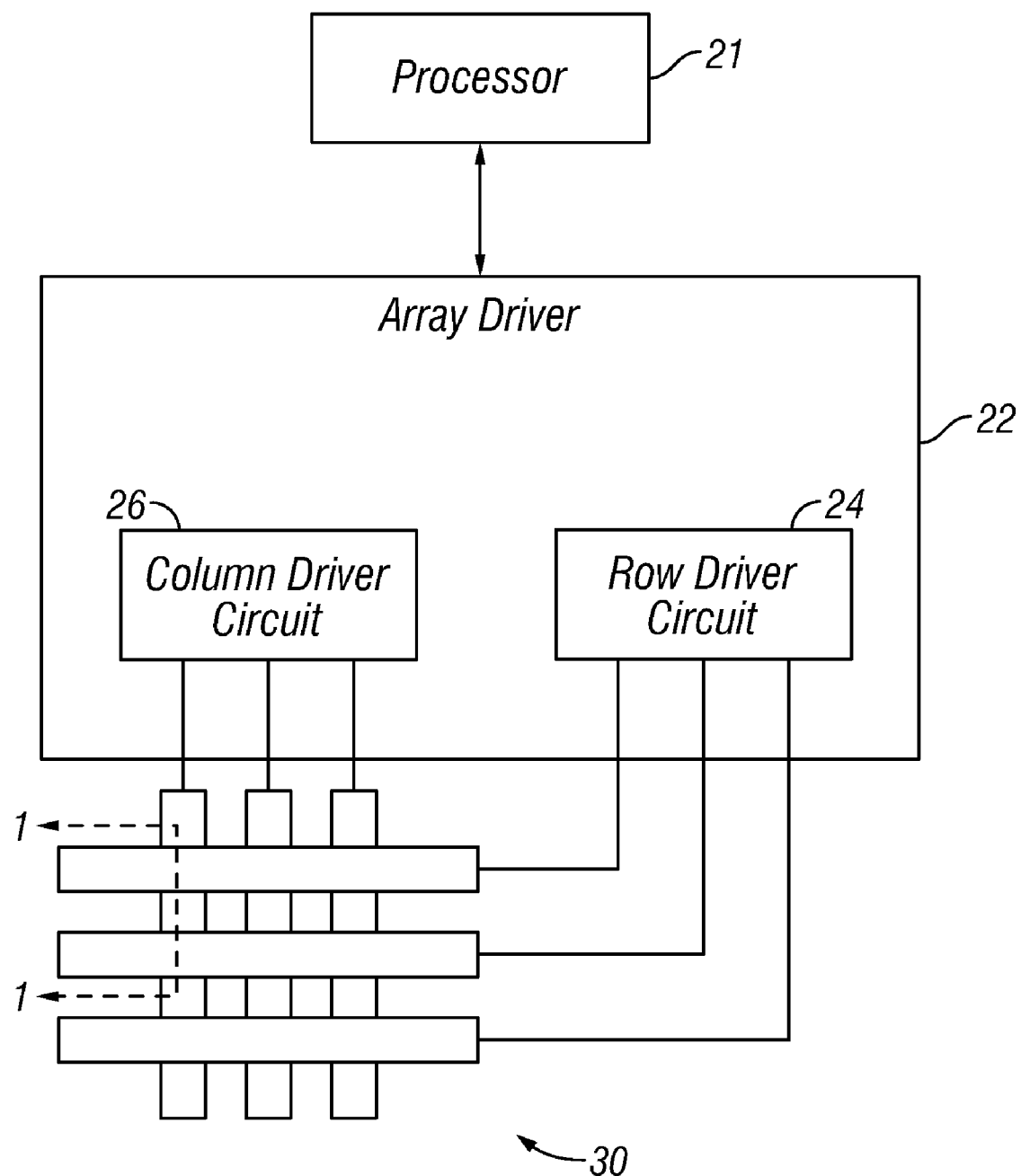
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
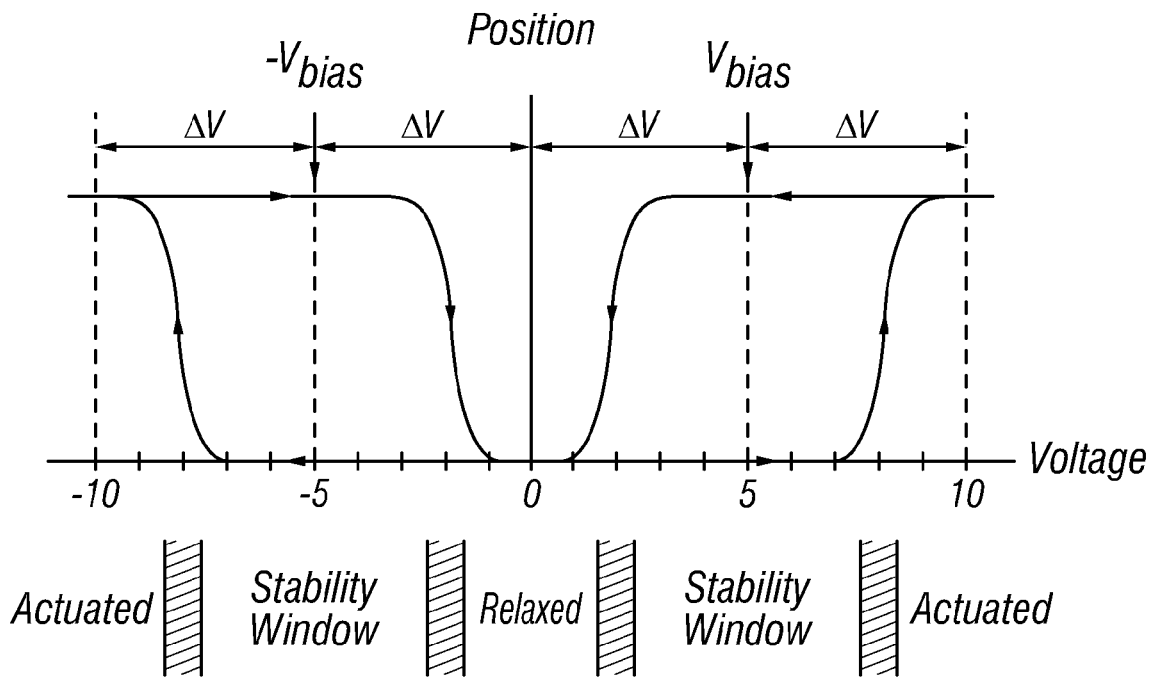
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

Figure 5A:
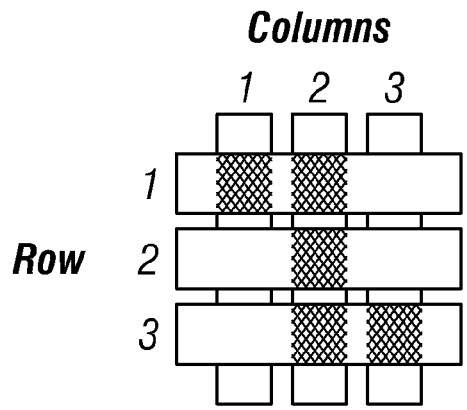
FIG. 5A illustrates one exemplary frame of display data in the 3×3 interferometric modulator display of FIG. 2.
Figure 5B:
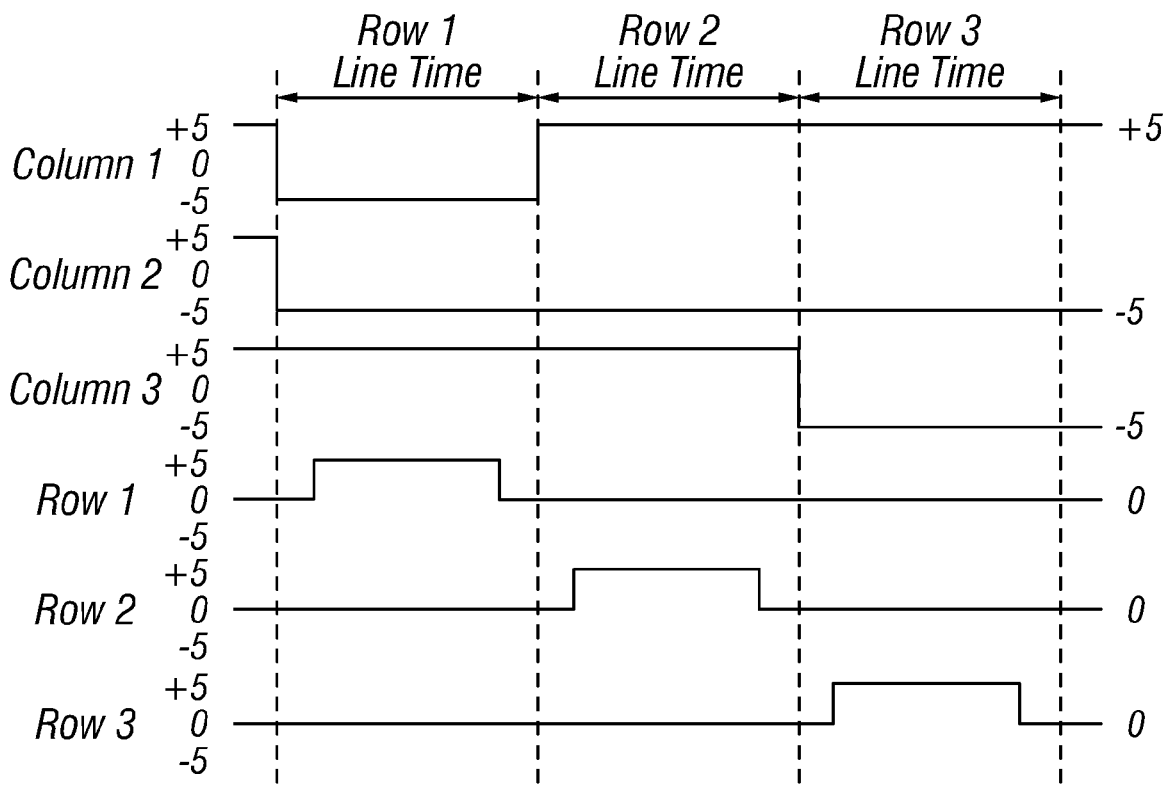
FIG. 5B illustrates one exemplary timing diagram for row and column signals that may be used to write the frame of FIG. 5A.

FIGS. 4 and 5A and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
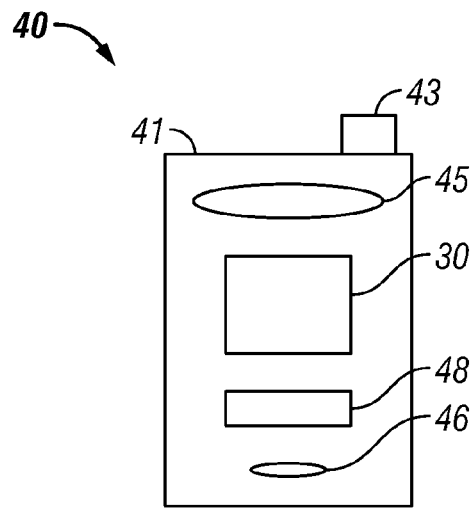
FIGS. 6A and 6B are system block diagrams illustrating an embodiment of a visual display device comprising a plurality of interferometric modulators.
Figure 6B:
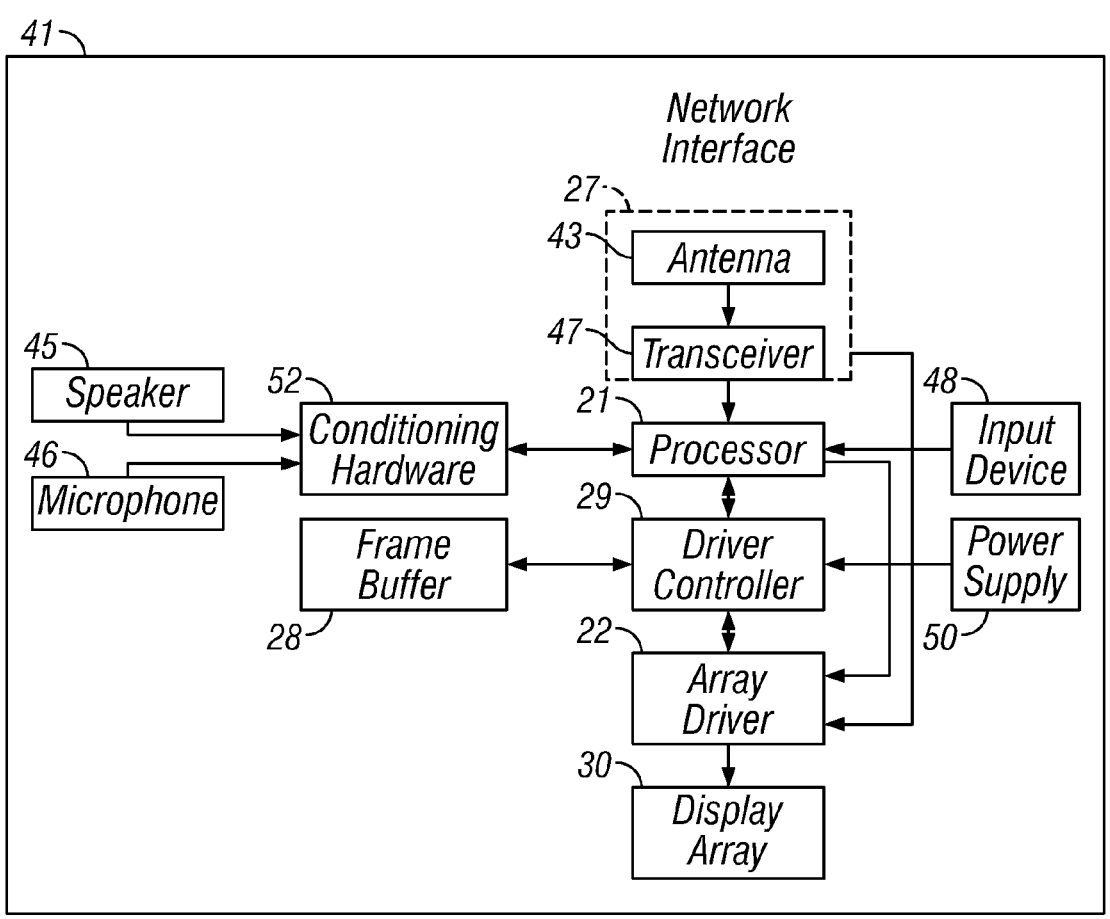

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
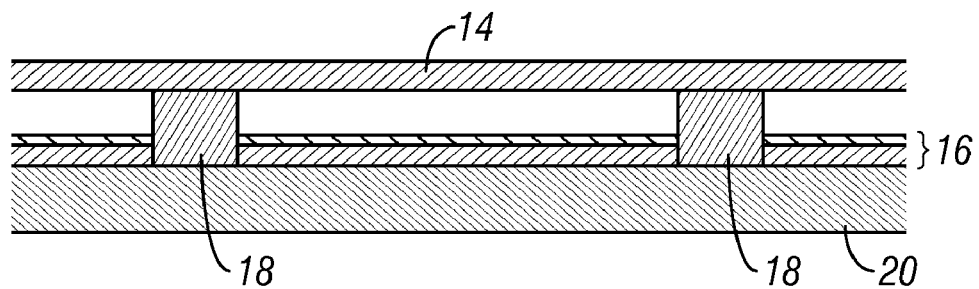
FIG. 7A is a cross section of the device of FIG. 1.
Figure 7B:
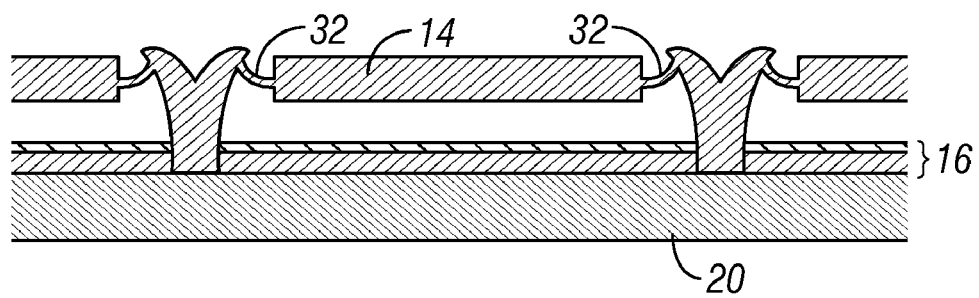
FIG. 7B is a cross section of an alternative embodiment of an interferometric modulator.
Figure 7C:
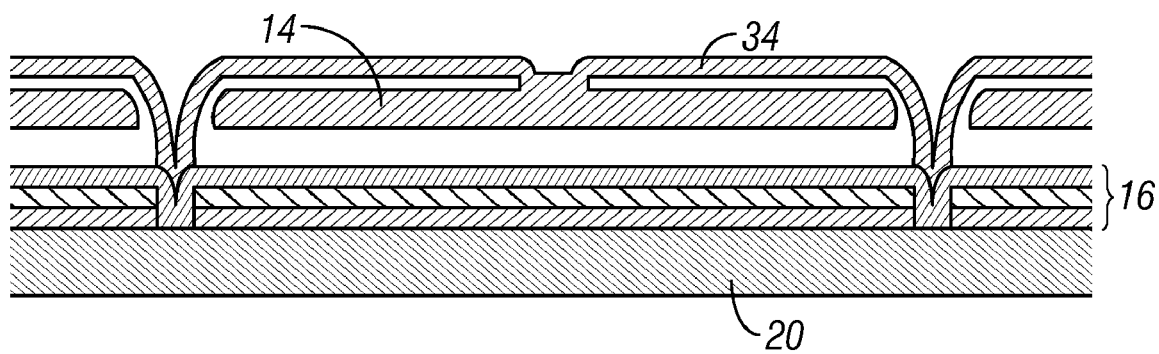
FIG. 7C is a cross section of another alternative embodiment of an interferometric modulator.
Figure 7D:
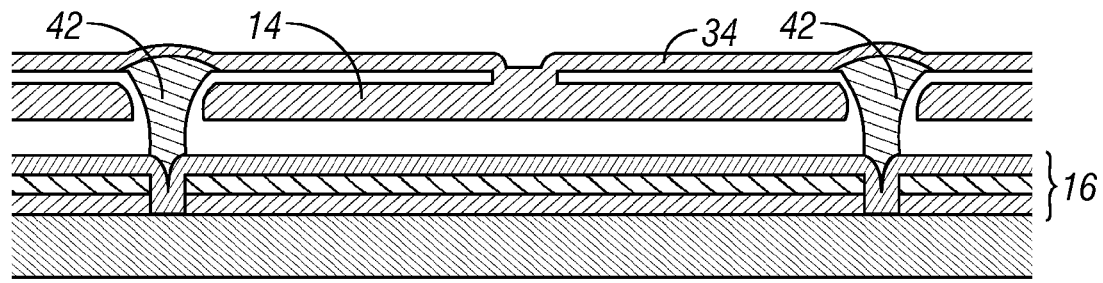
FIG. 7D is a cross section of yet another alternative embodiment of an interferometric modulator.
Figure 7E:
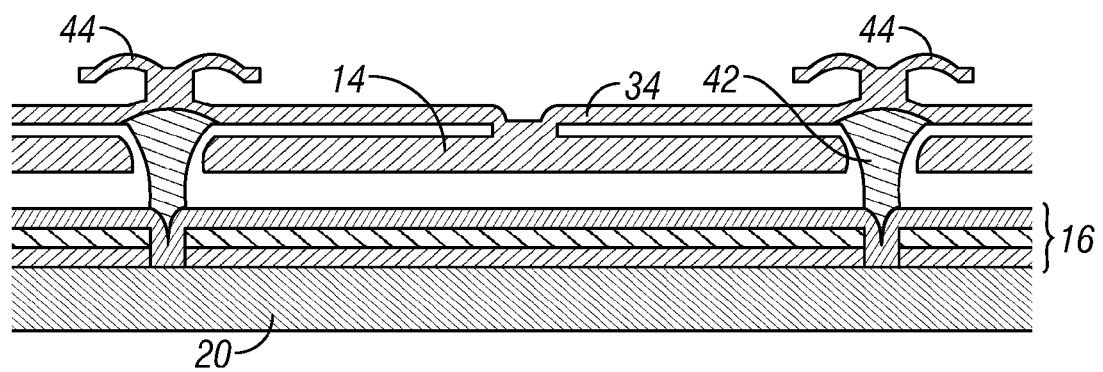
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Light incident on an interferometric modulator is either reflected or absorbed due to constructive or destructive interference, depending on the distance between the optical stack 16 and the reflective layer 14. The perceived brightness and quality of a display using interferometric modulators is dependent on the light incident on the display, since that light is reflected to produce an image in the display. In some circumstances, such as in low ambient light conditions, an illumination system may be used to illuminate the display to produce an image.

Figure 8:
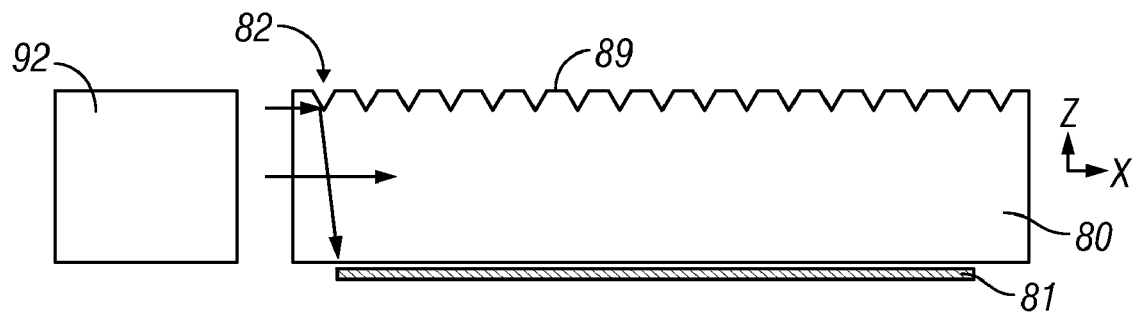
FIG. 8 is a cross section of a display device.

FIG. 8 is a cross section of a display device including an illumination system that includes a light guide panel 80 disposed adjacent a display 81. The light guide panel 80 includes a light turning film 89 having light turning features 82. A light source 92 injects light into the panel 80. The light turning features 82 direct the light propagating through the light guide panel 80 onto the display 81.

Figure 9:
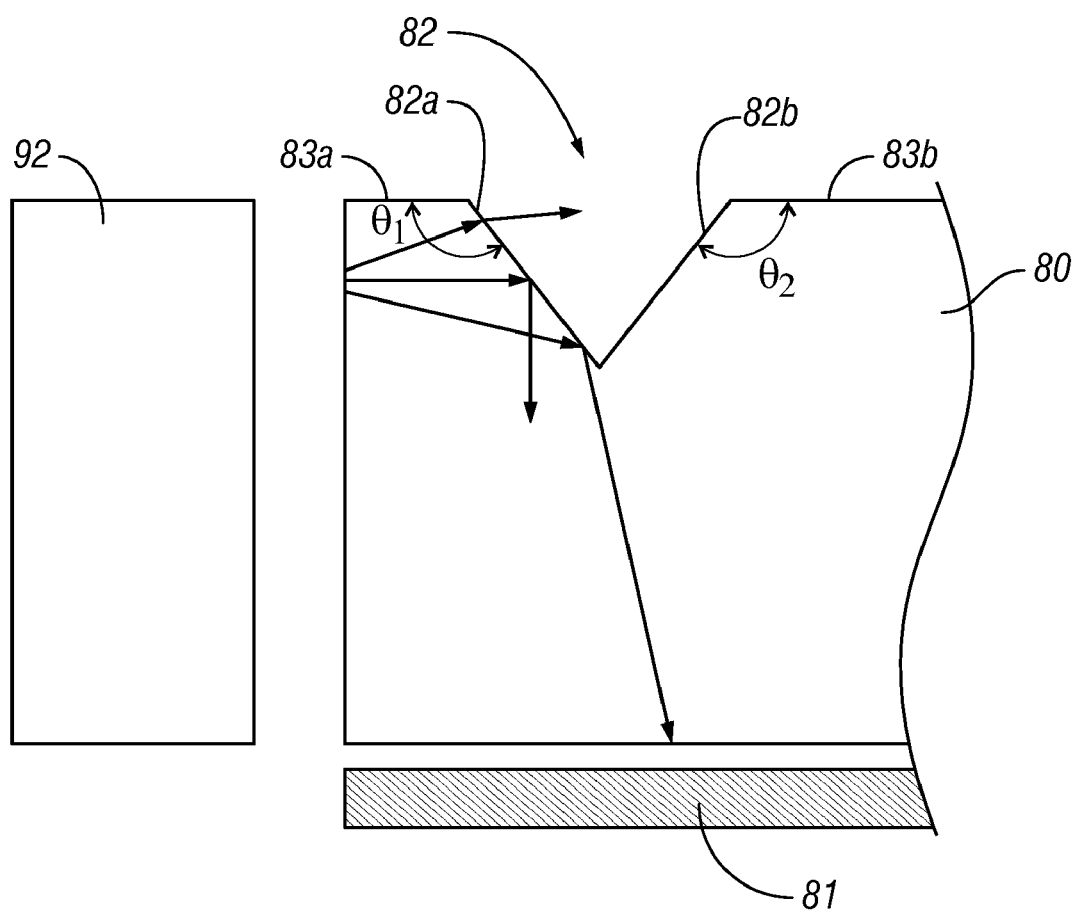
FIG. 9 is an enlargement of a portion of the cross section of FIG. 8.

With reference to FIG. 9, it has been found that the light turning features 82 are susceptible to light loss, which can reduce the amount of light redirected to the display 81. The features 82 are formed by facets 82a and 82b, which form angles $\theta_1$ and $\theta_2$ of greater than 90° with surfaces 83a, 83b, respectively. Typically, light incident the facet 82a is reflected either towards a display 81 or may continue to propagate inside the light guide panel 80 by total internal reflection. However, light incident the facet 82a at close to the angle of the normal to that surface is not reflected and can propagate out of the light guide panel 80, thereby causing light loss. In display light applications, this light loss can result in reduced display brightness and/or uniformity.

Figure 10A:
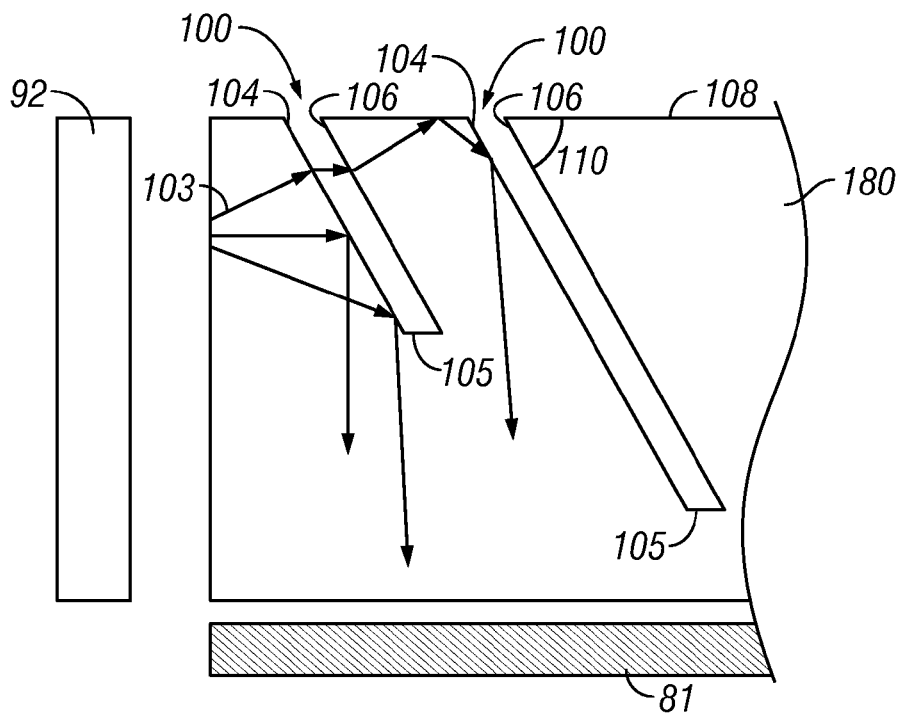
FIG. 10A is a cross section of an embodiment of a light turning feature.

With reference to FIG. 10A, some embodiments of the invention provide slits 100 for redirecting light propagating through a light guide body 180, which can be a panel of optically transmissive material. Advantageously, the slits 100 reduce light loss by recycling light that propagates out of the panel 180. For example, the ray 103 propagates out of the panel 180, but is then re-injected into the panel 180, where it continues to propagate until redirected as desired out of the panel 180 by contact with a facet 104.

It will be appreciated that the slits 100 are undercuts in the light guide body 180 and are defined by facets 104 and 106. The volume defined by the "undercut" extends at least partly directly over the surface 108 of the light guide body 180, when the surface 108 is positioned facing downwards. In some embodiments, the facet 106 and the surface 108 are contiguous through and define an angle 110, which is less than 90°. It will be appreciated that, while devoid of the material forming the light guide body 180, the slits 100 can be filled with another material that facilitates total internal reflection in the body 180. In other embodiments, the slits 100 can have an open volume and be completely devoid of solid material.

The facets 104 are angled to redirect or reflect, in a desired direction, light propagating through the panel 180. In some embodiments, light is injected into the light guide body by the light source 192, impinges on the facet 104 and is redirected towards the display 81.

Figure 10B:
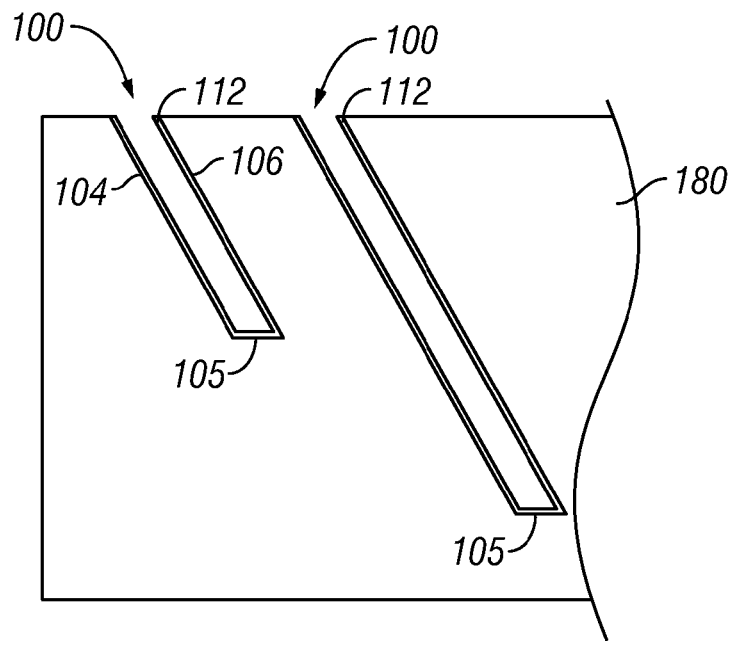
FIG. 10B is a cross section of another embodiment of a light turning feature.

With reference to FIG. 10B, the slits 100 are lined with an anti-reflective coating 112 in some embodiments. The anti-reflective coating 112 has advantages for reducing undesired light reflections. For example, for light exiting the facet 104, the coating 112 can minimize the reflection of light off of the facet 106, thereby facilitating the re-injection of light into the panel 180. Examples of anti-reflective coatings include, without limitation, silicon oxide ($SiO_2$), silicon nitride ($SiN_4$) and aluminum oxide ($Al_2O_3$) coatings.

In some embodiments, the slits 100 form a volume that is open to the surface 108. In some other embodiments, with reference to FIG. 10C, the slits 100 can be disposed completely within the light guide body 180. For example, the slits 100 can be formed under the surface 108 and a narrow connecting part 114 at an end of each slit 100 can be sealed, e.g., by the natural resiliency of the material forming the panel 180, or by application of a sealant or adhesive on those parts. The sealing of the parts 114 can reduce contamination of or damage to the slits 100 by protecting against external objects that may contact with the surfaces or edges of facets 104 and 106 of the slits 100. In some other embodiments, the narrow parts 114 are not sealed, but the opening defined by that part is relatively narrow compared to the illustrated transverse cross-sectional area of the slits 100, thereby also providing protection for the slits 100.

It will be appreciated that the illustrated slits 100 are not necessarily drawn to scale and their relative sizes can differ. Moreover, the relative angles of the facets 104 and 106 can differ from that illustrated. For example, the cross-sectional areas of the slits 100 can vary and the relative orientations and angles defined by the facets 104, 106 can vary from slit to slit.

Figure 10C:
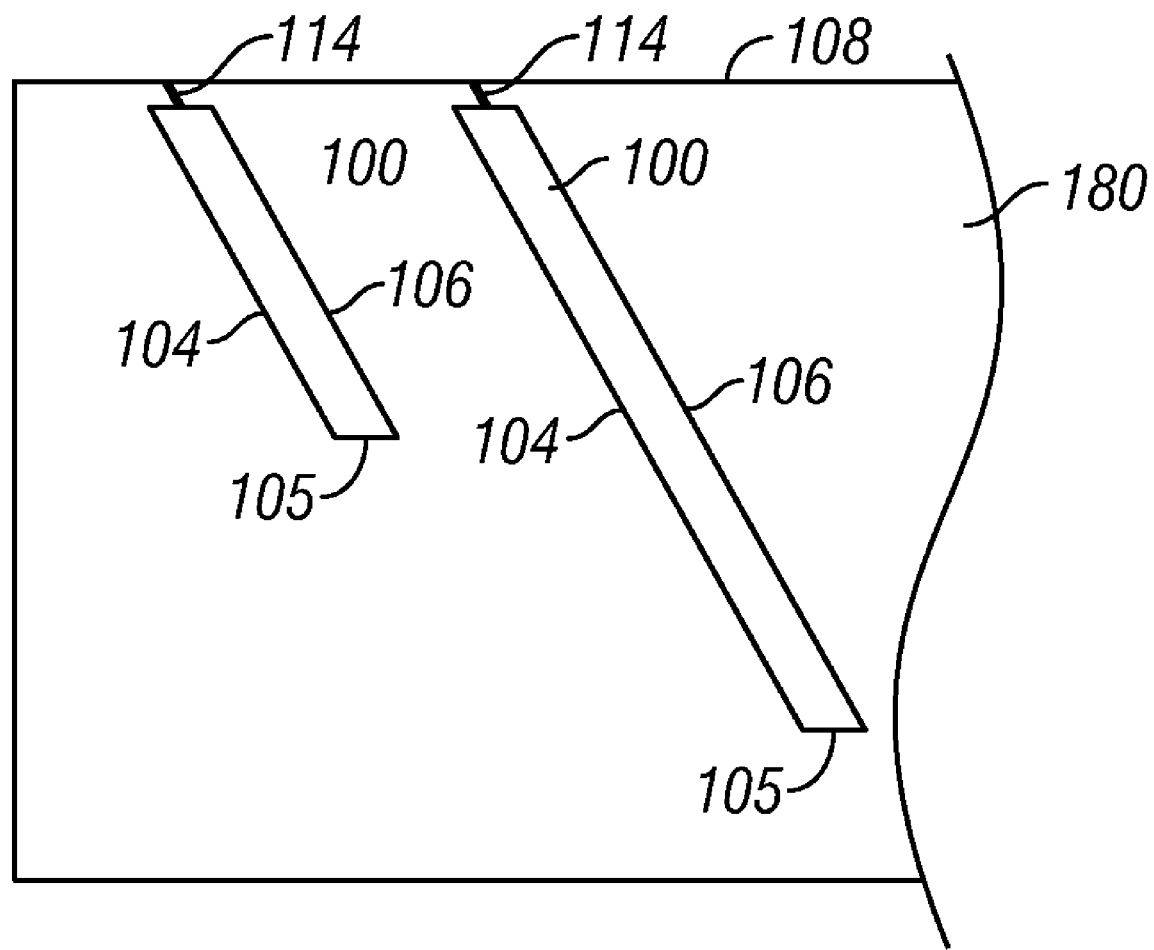
FIG. 10C is a cross section of yet another embodiment of a light turning feature.

With reference to FIGS. 10A-10C, in some embodiments, the facets 104 and 106 can be substantially parallel opposite one another, and can be joined by a single slit sidewall 105 that is parallel to the surface 108. The slit 100 can thus define a volume having the shape of a parallelogram. The parallel orientation of the slit sidewall 105 advantageously facilitates total internal reflection of light within the body 102, since the parallel sidewall 105 reflects light at similar angles to the surface 108.

The slits 100 can be utilized in various devices in which light turning, or redirection, is desired. In some embodiments, the slits 100 are utilized as light turning features in illumination devices. Such illumination devices can include wide area lights for indoor or outdoor use. For example, illumination devices can provide overhead lighting for rooms and other indoor spaces.

Figure 11A:
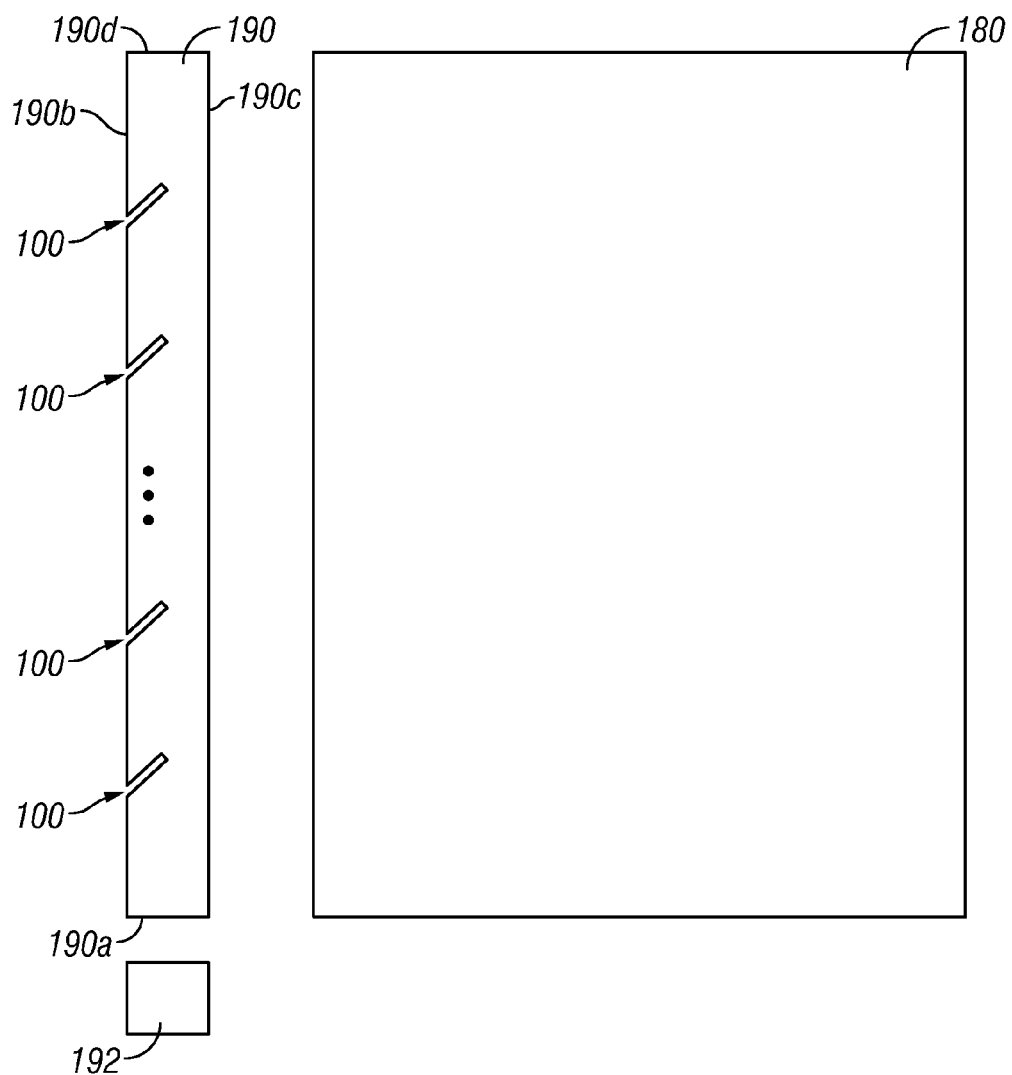
FIG. 11A is a top plan view of an embodiment of a display device.
Figure 11B:
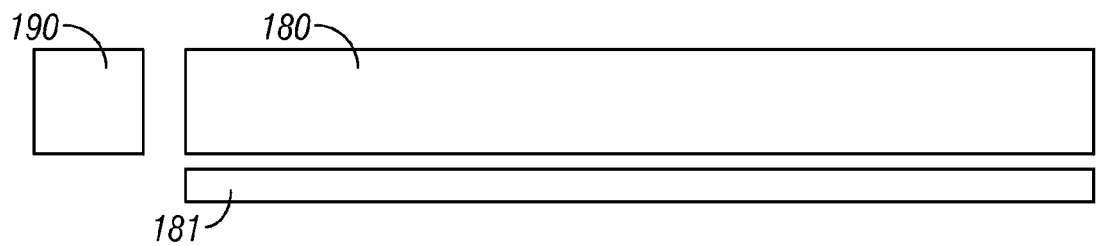
FIG. 11B is a cross section of the display device of FIG. 11A.

FIG. 11A is a top plan view of a display device having a light guide body 180 and an illumination system including a light bar 190 utilizing the slits 100 as light turning features. FIG. 11B is a cross section of the display device. The light bar 190 and light guide body 180 are formed of substantially optically transmissive material that can support the propagation of light through the lengths of those structures. For example, the light bar 190 and light guide body 180 can be formed of glass, plastic or other highly transparent materials.

With reference to both FIGS. 11A and 11B, the light guide body 180 is disposed adjacent and faces a display 181. The slits 100 are configured to turn light from the light bar 190 towards the display 181. In some embodiments, the illumination system acts as a front light. Light reflected from the display 181 is transmitted back through and out of the light guide body 180 towards the viewer. The display 181 can include various display elements, e.g., a plurality of spatial light modulators, interferometric modulators, liquid crystal elements, electrophoretic, etc., which can be arranged parallel the major surface of the panel 180. The display 181 is the display 30 (FIGS. 6A and 6B) in some embodiments.

With continued reference to FIG. 11A, the light bar 190 has a first end 190*a* for receiving light from a light emitter 192. The light bar 190 and the light emitter 192 together form a line light source. The light emitter 192 may include a light emitting diode (LED), although other light emitting devices are also possible. Light emitted from the light emitter 192 propagates into the light bar 190. The light is guided therein, for example, via total internal reflection at sidewalls thereof, which form interfaces with air or some other surrounding fluid or solid medium. For example, where the light bar 190 is formed of a material with a similar refractive index as the light guide body 180, the light bar 190 can be separated from the light guide body 180 by air, fluid or solid medium to promote total internal reflection within the light bar 190.

The light bar 190 includes slits 100 on at least one side, for example, the side 190*b* that is substantially opposite the light guide body 180. The slits 100 are configured to turn light incident on that side 190*b* of the light bar 190 and to direct that light out of the light bar 190 (e.g., out side 190*c*) into the light guide body 180. It will be appreciated that the slits 100 shown in FIG. 11A are schematic. The sizes, shapes, densities, position, etc. of the slits 100 can vary from that depicted to achieve the desired light turning effect. For example, in some embodiments, the slits 100 extend further into the body of the light bar 190 with increasing distance from the side 190*a*.

In certain embodiments, the illumination apparatus further includes a coupling optic (not shown) between the light bar 190 and the light guide body 180. For example, the coupling optic may collimate, magnify, diffuse, change the color, etc., of light propagating from the light bar 190.

Accordingly, light travels from the first end 190*a* in the direction of a second end 190*d* of the light bar 190, and can be reflected back again towards the first end 190*a*. Along the way, the light impinging on the slits 100 is turned towards the adjacent light guide body 180. The light guide body 180 is disposed with respect to the light bar 190 so as to receive light that has been turned by the slits. The light guide body 180, in turn, redirects light out of the light guide body 180 and towards the display 181.

Figure 11C:
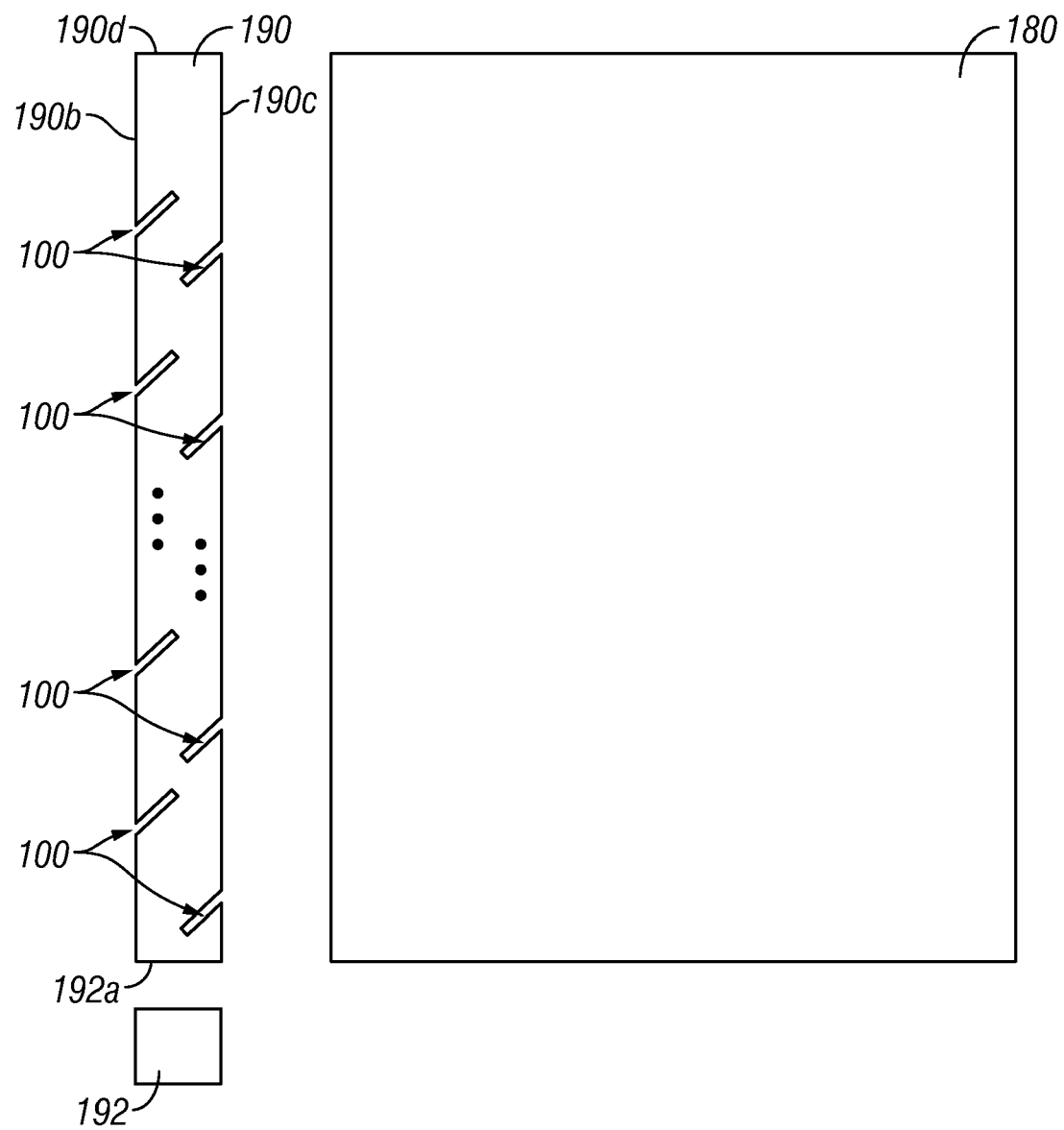
FIGS. 11C-11E are top plan views of embodiments of display devices.

While shown for ease of discussion and illustration on one side of the light bar 190 (FIG. 11A), in some embodiments, the slits 100 are formed along multiple surfaces of the light bar 190. With reference to FIG. 11C, the slits 100 are formed along the sides 190*b* and 190*c* of the light bar 190. Forming slits 100 on multiple sides can have advantages for more efficiently turning light, per unit length of the light bar 190. In addition, the spacing between slits 100 on each side 190*b*, 190*c* can be increased for a given density of the slits 100 per unit length of the light bar 190, which can have advantages for facilitating the manufacturing of dense slit patterns. It will be appreciated that the slits in the surfaces 108 and 109 can differ in one or more of total number, transverse cross-sectional shape, dimensions, and angles formed between the slits and the major surfaces.

Figure 11D:
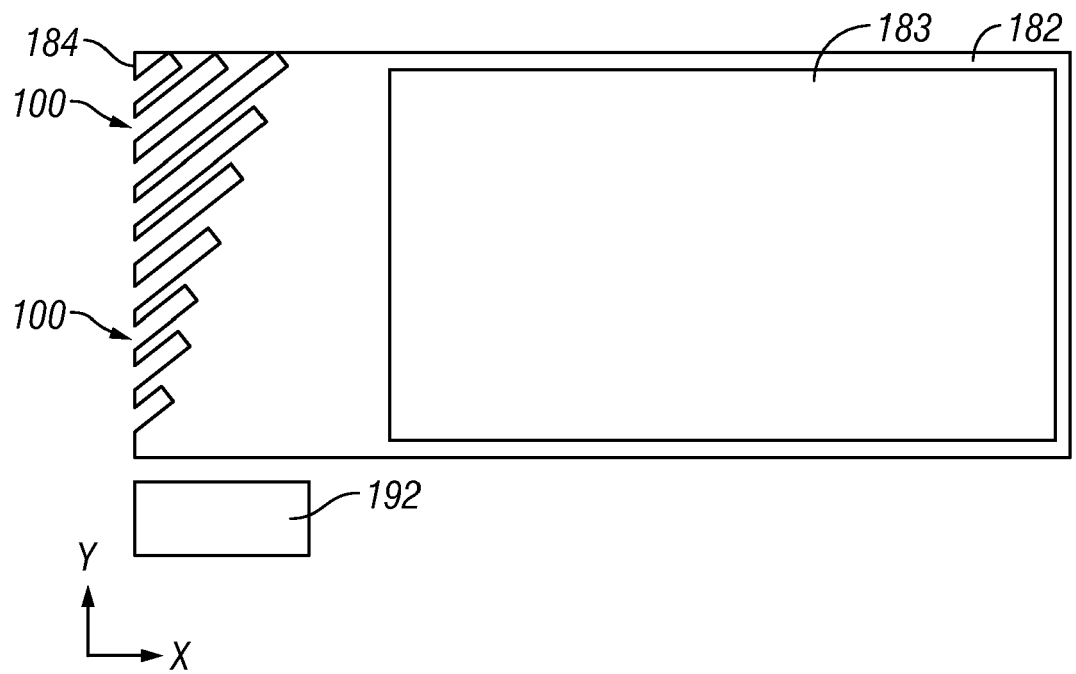

With reference to FIG. 11D, a light bar such as the light bar 190 can be integrated into a light guide body, thereby forming a single light guide body/light bar structure 182. The integrated light guide body/light bar structure 182 has advantages for manufacturing and for reducing the number of components in a display device. It will be appreciated that the light turning features can take various forms, including prismatic features such as the slits 100 (as discussed further herein), holographic features, or various other light turning features known in the art.

It will be appreciated that the light guide body 182 or 180 (FIGS. 10-11C) is defined by first and second opposite edges. As illustrated, the slits 100 may be formed in one of these edges and redirect light in a direction towards the opposite edge. Third and fourth edges further define the light guide body 182, with light entering into the light guide body by impinging, e.g., the third edge (the lower edge in FIG. 11E). The light guide body 182 also contains upper and lower major sides or surfaces (stretching from the first to the second edge and from the third to the fourth edge).

Light is injected into the light guide body 182 from the light emitter 192. The light can be collimated and is redirected by the slits 100 towards the display area 183, where light turning features redirect the light towards a display (not shown).

With continued reference to FIG. 11D, slits 100 closer to the light emitter 192 can block light from reaching the surfaces of other slits 100 farther from the light emitter 192. With increasing distance from the light emitter 192 along the Y-axis, the slits 100 extend further along the X-axis, to allow contact with light from the light emitter 192. In some embodiments, the slits 100 farthest from the light emitter 192 can span substantially the entire length of the emitter 192 along the X-axis.

It will be appreciated that the pitch or density of the slits 100 along the Y-axis, the length of the slits 100 along the X-axis and the angles of the slits can be uniform or can vary to achieve a desired light turning effect. For example, in some embodiments, the exposed surface area of the slits 100 for contacting and turning light are substantially equal per unit length along the Y-axis, thereby facilitating a uniform flux of turned light per unit length along the Y-axis.

To further increase the efficiency of the light extraction (i.e., to increase the proportion of the emitted light that is turned towards the display area 183), light from the light emitter 192 is angled towards an edge 184 of the illustrated light guide body 182, along which the slits 100 are formed. The light can be angled by, e.g., attaching the light emitter 192 to the light guide body 182 at an angle, or by use of an appropriate optical component or film to direct the light in the desired direction. Advantageously, the light that is not turned can be recycled, thereby increasing the efficiency of the light extraction relative to arrangements in which the light is not directed along the edge in which the slits 100 are formed.

Figure 11E:
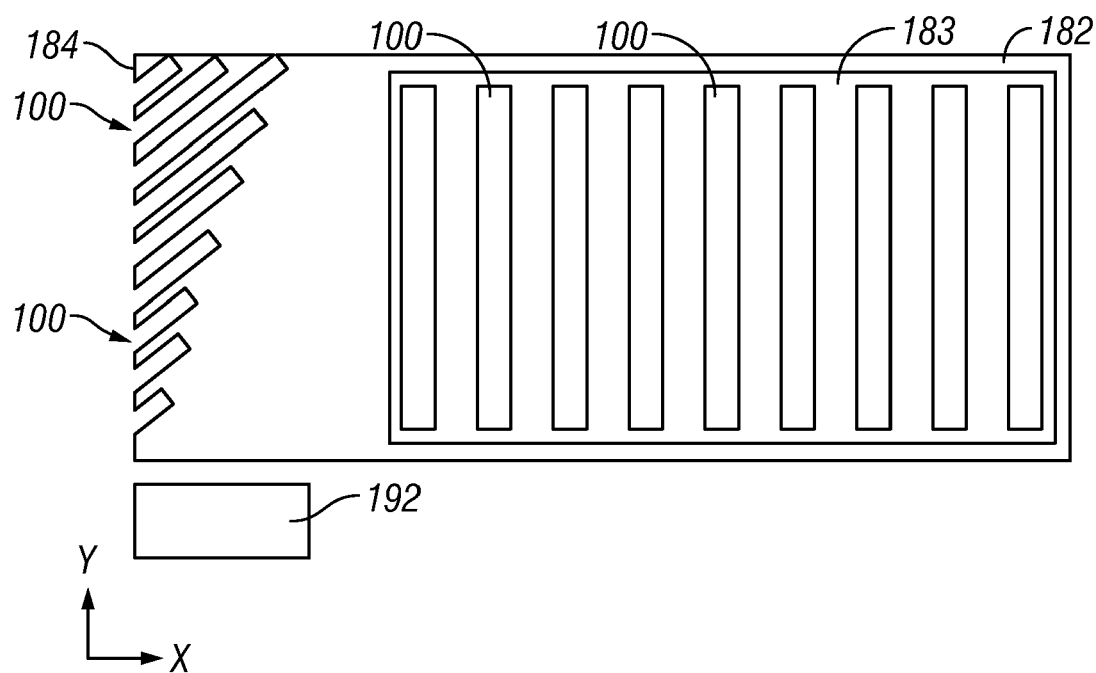

With reference to FIG. 11E, as noted above, in some embodiments, additional slits 100 are provided in an area 182 corresponding to a display. Light is emitted from the light emitter 192, the light is then turned by the slits 100 on the edge 184, and the turned light is turned towards a display (not shown) by the slits 100 in the display area 182.

Figure 12A:
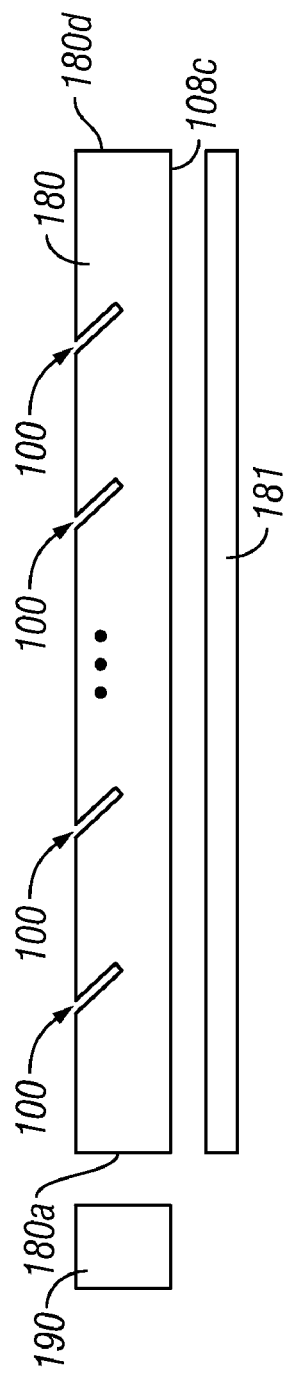
FIGS. 12A-12B are cross sections of embodiments of display devices.

In some other embodiments, the slits 100 can be provided in a light guide body without slits 100 that form the light turning features of a light bar. FIG. 12A shows a cross section of a display device including a light guide body 180 having slits 100. The light bar 190 injects light into a first end 180a of the light guide body 180. The light travels from the first end 180a in the direction of a second end 180d of the light guide body 180, and can be reflected back again towards the first end 180a by total internal reflection. As it propagates through the light guide body 180, some of the light impinges on the slits 100 and is turned towards the display 181.

With continued reference to FIG. 12A, the slits 100 are formed along the major side or surface 180b, which faces the display 181. In some other embodiments, with reference to FIG. 12B, the slits 100 can be disposed along both major surfaces of the light guide body 180, e.g., along both major sides 180b and 180c. As noted above, forming slits 100 along multiple surfaces can have advantages for efficiently turning light and for ease of manufacture, where a high density of slits is desired for a unit length of the light guide body 180. While shown separated from the end 180a in the FIGS. 12A and 12B for ease of illustration, it will be appreciated that the light bar 190 can form an integrated structure with the light guide body 180, or can be separated. For example, the light bar 190 of FIGS. 12A and 12B can form a unitary light guide body, with slits in the light bar 190 and a major surface of the light guide body.

Figure 12B:
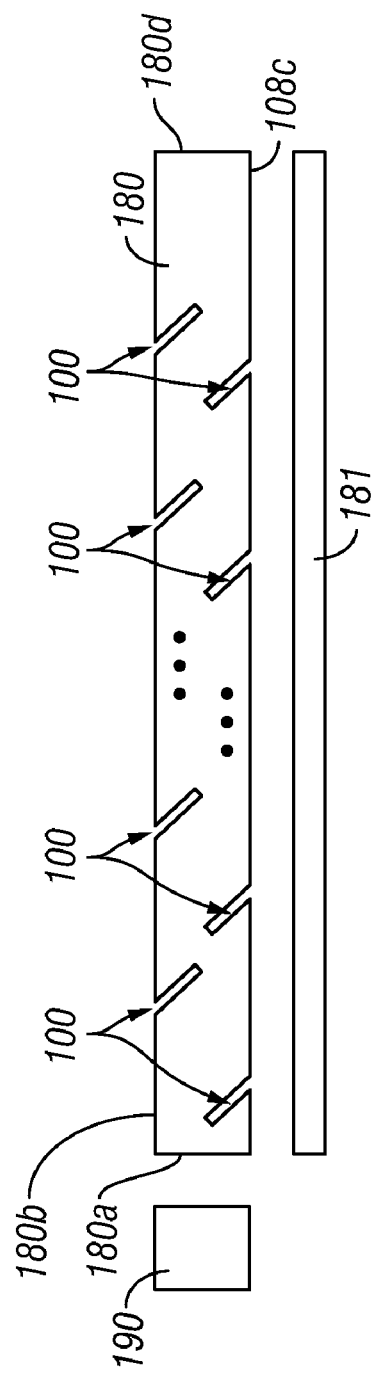

The slits 100 can be distributed in the light bar 190, the light turning light guide body 180 and the integrated light guide body/light bar structure 182 in various patterns to achieved desired light turning properties. It will be appreciated that uniformity of power per area is desired in many applications to uniformly light the display 181 (FIGS. 11B, 12A and 12B). The slits 100 may be arranged to achieve good uniformity in power per area.

Figure 13A:
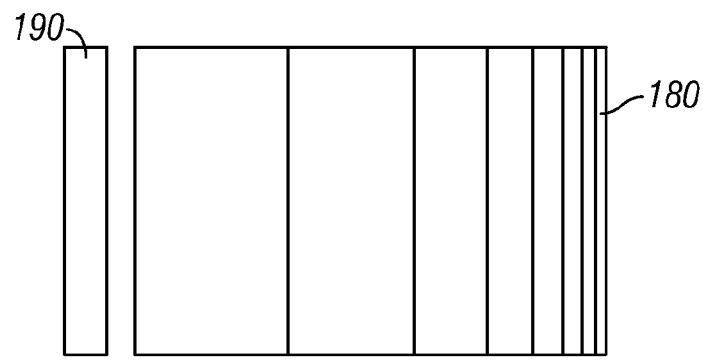
FIGS. 13A-13C are top plan views of embodiments of display devices.
Figure 13B:
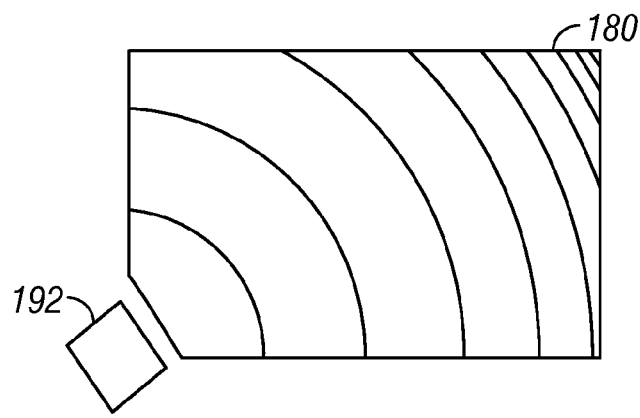
Figure 13C:
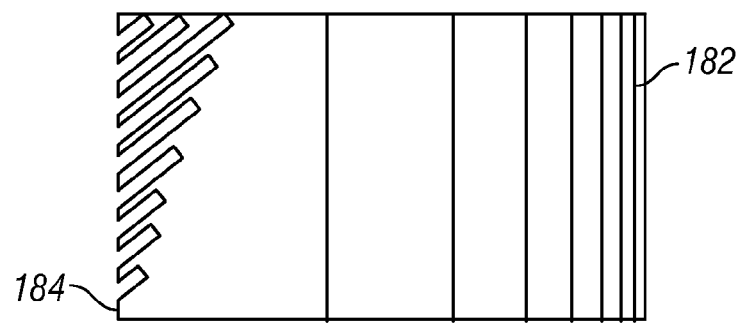

With reference to FIGS. 13A, 13B and 13C, the density of the slits 100 increases with increasing distance from the light bar 190 (FIG. 13A), the point light emitter 192 (FIG. 13B) or the edge 184 (FIG. 13C). With reference to FIG. 13A, the number of slits 100 per unit area (in one or both of the top and bottom major sides of the light guide body 180) increases with increasing distance from the edge of the light guide body 180 directly adjacent the light bar 190. The slits 100 extend in substantially straight lights parallel to the light bar 190.

With reference to FIG. 13B, the number of slits 100 per unit area (in one or both of the top and bottom major sides of the light guide body 180) increases with distance from the point light source 192. The slits 100 for semicircular segments centered on the point light source 192.

With reference to FIG. 13C, the number of slits 100 per unit area (in one or both of the top and bottom major sides of the light guide body 180) increases with distance from the edge 184. The additional slits 100 along that edge turn light and allow that side of the light guide body 182 to function as a line light source.

In some embodiments, the varying density of the slits 100 allows the flux of light redirected per unit area to be highly uniform over the area of the light turning light guide body 180, 182 corresponding to the display 181. As light propagates through the light turning light guide body 180, 182, some amount of light contacts the slits 100 and is redirected out of the light guide body 180, 182. Thus, the remaining light propagating through the light guide body 180, 182 decreases with distance from the light source, as more and more light is redirected by contact with the slits 100. To compensate for the decreasing amounts of light propagating through the light guide body 180, 182, the density of the slits 100 increases with distance from a light point source or line light source.

It will be appreciated that the density of the slits refers to the area occupied by the slits 100 per unit area of a body of material in which the slits are formed. A single large slit 100 or a plurality of smaller slits 100 in a given area may have the same density. Thus, the density may be changed due to, e.g., changes in the sizes and/or numbers of the slits 100 per area.

The slits 100 can be formed by various methods. In some embodiments, the slits 100 are formed as a body of light propagating material, such as a light guide body or light bar, is formed. For example, the body of light propagating material can be formed by extrusion through a die having an opening corresponding to a cross-sectional shape of a light guide body or light bar and also having projections in the die corresponding to the slits 100. The material forming the body is pushed and/or drawn through the die in the direction in which the slits 100 extend, thereby forming a length of material having the desired cross-sectional shape and having the slits 100. The length of material is then cut into the desired dimensions for a light guide body or light bar.

In another example, the body of light propagating material can be formed by casting, in which material is placed in a mold and allowed to harden. The mold contains extensions corresponding to the slits. Once hardened, the body of light propagating material is removed from the mold. The mold can correspond to a single light guide body or light bar, such that the removed body of light propagating material can be used as a single light turning light guide body or light bar. In other embodiments, the mold produces a large sheet of material, which is cut into desired dimensions for one or more light turning light guide bodys and/or light bars.

In yet another example, the body of light propagating material is formed by injection molding, in which a fluid material is injected into a mold and then ejected from the mold after hardening. Where the mold corresponds to a single light guide body or light bar, the removed body of light propagating material can be used as a single light turning light guide body or light bar. The mold may also produce a large sheet of material, and the sheet is cut into desired dimensions for one or more light turning light guide bodys and/or light bars.

In some other embodiments, the slits 100 are formed after formation of a light turning body. For example, the slits 100 can be formed by embossing, in which a die, having protrusions corresponding to the slits 100, is pressed against a body of light propagating material to form the slits 100 in the body. The body can be heated, making the body sufficiently malleable to take the shape of the slits 100.

In another example, material is removed from the body of light propagating material to form the slits 100. For example, the slits 100 can be formed by machining or cutting into the body. In other embodiments, material is removed from the body by laser ablation.

It will be appreciated that the methods disclosed herein can be utilized to form light bars and/or light guide bodys. In some embodiments, the light bars can be formed after formation of the light guide body. For example, after forming a sheet of material having slits (e.g., by extrusion, casting, injection molding, or removal of material from a body of light propagating material), the sheet of material can be cut or stamped into a desired shape. In this cutting or stamping process, slits 100 can be formed at an edge of a light guide body.

In some other embodiments, a light guide body is formed in sections that are later combined. The sections can be formed using the methods disclosed herein. The sections are glued or otherwise attached together with a refractive index matching material to form a single light guide body. Section by section formation of a light guide body allows the formation of curved slits 100 that may otherwise be difficult for a particular method to form as a single continuous structure.

In some embodiments, the light guide body is attached to a display after being formed. The light guide body is also attached to a light source to form a display device having an illumination system.

It will be understood by those skilled in the art that, although this invention has been disclosed in the context of certain preferred embodiments and examples, the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by the claims that follow.

We claim:

1. A light guide apparatus, comprising:
   a light guide body formed of a light propagating material supporting propagation of light through a length of the light guide body, the light guide body defined by a plurality of exterior surfaces,
   wherein a first of the exterior surfaces comprises:
      a first plurality of spaced-apart slits configured to redirect light incident on the light guide body, each slit of the first plurality of spaced-apart slits formed by an undercut in the first exterior surface; and
   wherein a second of the exterior surfaces comprises:
      a second plurality of spaced-apart slits configured to redirect light incident on the light guide body, each slit of the second plurality of spaced-apart slits formed by an undercut in the second exterior surface.

2. The apparatus of claim 1, wherein the light guide body is defined by first and second opposite edges, third and fourth opposite edges, and first and second opposite major sides extending between the first and second and third and fourth edges.

3. The apparatus of claim 2, wherein the first exterior surface is a surface of the first major side and wherein the first plurality of slits is formed by undercuts in the first major side.

4. The apparatus of claim 3, wherein the second exterior surface is a surface of the first edge and wherein the second plurality of slits is formed by undercuts in the first edge.

5. The apparatus of claim 4, wherein the second plurality of slits are configured to redirect light, propagating from the third edge, across the light guide body towards the second edge and wherein the first plurality of slits is configured to redirect the light redirected by the second plurality of slits towards the second major side.

6. The apparatus of claim 3, wherein the second plurality of slits is formed by undercuts in the second major side and wherein the first and second pluralities of slits are configured to redirect light, propagating from a direction of the first edge, towards the second major side.

7. The apparatus of claim 2, wherein a density of the slits increases with increasing density from the first edge.

8. The apparatus of claim 2, wherein a surface area of the slits increases with increasing density from the first edge.

9. The apparatus of claim 1, wherein an angle formed between a slit and the first exterior surface vary among the first plurality of slits or between the first and second pluralities of slits.

10. The apparatus of claim 1, wherein the surface area of a slit varies among the first plurality of slits or between the first and second pluralities of slits.

11. The apparatus of claim 1, further comprising an antireflective coating on surfaces of the first and second pluralities of slits.

12. The apparatus of claim 1, wherein the slits define spaced-apart concentric semicircles.

13. The apparatus of claim 1, further comprising:
a display;
a processor that is configured to communicate with the display, the processor being configured to process image data; and
a memory device that is configured to communicate with the processor.

14. The apparatus of claim 13, further comprising a driver circuit configured to send at least one signal to the display.

15. The apparatus of claim 14, further comprising a controller configured to send at least a portion of the image data to the driver circuit.

16. The apparatus of claim 13, further comprising an image source module configured to send the image data to the processor.

17. The apparatus of claim 16, wherein the image source module comprises at least one of a receiver, transceiver, and transmitter.

18. The apparatus of claim 13, further comprising an input device configured to receive input data and to communicate the input data to the processor.

19. The apparatus of claim 13, wherein the light guide body constitutes a front light for the display, the front light comprising a light source configured to propagate light through the light guide body, the first plurality of slits configured to redirect the light towards the display.

20. The apparatus of claim 19, wherein the display comprises a plurality of interferometric modulators, the interferometric modulators forming pixel elements.

21. An illumination apparatus, comprising: a light turning body; a first means for generating light and directing the light to propagate through the light turning body; a second means for redirecting the light propagating through the light turning body, wherein the second means includes a plurality of slits formed by undercuts in a first surface of the light turning body; and a third means for redirecting the light propagating through the light turning body, wherein the third means includes a plurality of slits formed by undercuts in a second surface of the light turning body.

22. The apparatus of claim 21, wherein the first means comprises a light emitting diode.

23. The apparatus of claim 22, wherein the second means comprises a plurality of slits formed by undercuts in the edge of the light turning body, wherein the light emitting diode is localized at an edge of the light turning body and wherein the second means is configured to redirect light from the light emitting diode across a length of the light turning body.

24. The apparatus of claim 21, further comprising a fourth means for displaying an image through the light turning body.

25. The apparatus of claim 24, wherein the fourth means comprises a plurality of interferometric modulators, the interferometric modulators forming pixel elements.

26. A method for illumination, comprising:
propagating light through a light turning body; and
redirecting the light by impinging the light on facets of a first and a second plurality of slits, the pluralities of slits formed by undercuts in two surfaces of the light turning body.

27. The method of claim 26, wherein the light guide body is defined by first and second opposite edges, third and fourth opposite edges, and first and second opposite major sides extending between the first and second and third and fourth edges, wherein the first plurality of slits is disposed in the first edge,
wherein propagating the light comprises directing the light into the third edge of the light turning body,
wherein redirecting the light comprises redirecting the light coming from the third edge in a direction across the light guide body towards the second edge.

28. The method of claim 27, wherein the second plurality of slits is disposed in the first major side, wherein redirecting the light further comprises redirecting the light towards the second major side.

* * * * *